United States Patent
Vu

(10) Patent No.: US 8,307,854 B1
(45) Date of Patent: Nov. 13, 2012

(54) FLUID DELIVERY SUBSTRATES FOR BUILDING REMOVABLE STANDARD FLUID DELIVERY STICKS

(75) Inventor: Kim Ngoc Vu, Yorba Linda, CA (US)

(73) Assignee: Vistadeltek, Inc., Yorba Linda, CA (US)

( * ) Notice: Subject to any disclaimer, the term of this patent is extended or adjusted under 35 U.S.C. 154(b) by 441 days.

(21) Appl. No.: 12/777,327

(22) Filed: May 11, 2010

Related U.S. Application Data

(60) Provisional application No. 61/178,286, filed on May 14, 2009.

(51) Int. Cl.
*F16K 11/10* (2006.01)
(52) U.S. Cl. .................................................... 137/884
(58) Field of Classification Search ................ 137/267, 137/271, 597, 884
See application file for complete search history.

(56) References Cited

U.S. PATENT DOCUMENTS

| | | | |
|---|---|---|---|
| 3,025,878 A | 3/1962 | Hupp |
| 3,234,964 A | 2/1966 | Tinsley et al. |
| 3,384,115 A | 5/1968 | Drazen et al. |
| 3,476,214 A | 11/1969 | Callahan |
| 3,486,519 A | 12/1969 | Olson |
| 3,509,904 A | 5/1970 | Olson |
| 3,534,797 A | 10/1970 | Reinhard |
| 3,831,951 A | 8/1974 | Patel et al. |
| 3,909,011 A | 9/1975 | Sheesley |
| 3,915,194 A | 10/1975 | Friedrich |
| 3,934,605 A | 1/1976 | Legris |
| 3,993,091 A | 11/1976 | Loveless |
| 4,008,736 A | 2/1977 | Wittmann-Liebold et al. |
| 4,067,531 A | 1/1978 | Sikula |
| 4,080,752 A | 3/1978 | Burge |
| 4,082,324 A | 4/1978 | Obrecht |
| 4,093,329 A | 6/1978 | Asbill, III |
| 4,168,724 A | 9/1979 | Graffunder et al. |

(Continued)

FOREIGN PATENT DOCUMENTS

EP 0169963 A1 2/1986

(Continued)

OTHER PUBLICATIONS

International Search Report and Written Opinion from corresponding International Application No. PCT/US2010/037922 dated Jan. 5, 2011.
"Physics and Chemistry of Speciality Gases for Advanced Semiconductor Processings II, Advanced Gas Technology—key to high performance Semiconductor process," Sponsored by Ultra Clean Society, 18th Workshop on ULSI Ultra Clean Society, Jun. 26-27, 1992, pp. 15-24.
"What You Can Get in Manifolds", Hydraulics and Pneumatics, vol. 16, No. 11, pp. 88-89, Nov. 1963.

(Continued)

*Primary Examiner* — John Fox
(74) *Attorney, Agent, or Firm* — Lando & Anastasi, LLP

(57) ABSTRACT

A fluid delivery system that includes flow substrates and manifolds that minimize the number of fluid conduit ports and seals needed to build standardized fluid delivery sticks. Each flow substrate has a component attachment surface with one or more component conduit ports and an associated plurality of fastener apertures. Some flow substrates incorporate a transverse manifold connection conduit port on a surface opposite the component attachment surface. Fastener apertures associated with the transverse manifold connection conduit port are accessible adjacent to installed fluid handling components. Transverse connection between fluid delivery sticks use a welded assembly of fluid conduits to provide a transverse connecting lower layer which is sealingly retained by fasteners inserted from above through apertures associated with the transverse manifold connection conduit port. Flow substrates for each fluid delivery stick are fastened to a standardized bracket and each fluid delivery stick arrangement can be assembled and tested as an integrated subassembly.

6 Claims, 17 Drawing Sheets

U.S. PATENT DOCUMENTS

| | | | |
|---|---|---|---|
| 4,181,141 A | 1/1980 | Stoll et al. | |
| 4,247,133 A | 1/1981 | Moller | |
| 4,304,120 A | 12/1981 | Myers et al. | |
| 4,352,532 A | 10/1982 | Hardin | |
| 4,378,123 A | 3/1983 | Largent et al. | |
| 4,432,392 A | 2/1984 | Paley | |
| 4,490,083 A | 12/1984 | Rebish | |
| 4,524,807 A | 6/1985 | Toliusis | |
| 4,558,845 A | 12/1985 | Hunkapiller | |
| 4,681,476 A | 7/1987 | Mischenko | |
| 4,714,091 A | 12/1987 | Wagner | |
| 4,773,446 A | 9/1988 | Farnsworth et al. | |
| 4,807,660 A | 2/1989 | Aslanian | |
| 4,815,280 A | 3/1989 | Tujimura et al. | |
| 4,815,496 A | 3/1989 | Nishitani et al. | |
| 4,921,072 A | 5/1990 | Divisi | |
| 4,984,460 A | 1/1991 | Isoda | |
| 5,141,021 A | 8/1992 | Shimomura et al. | |
| 5,178,191 A | 1/1993 | Schaefer | |
| 5,255,553 A | 10/1993 | Hale et al. | |
| 5,275,074 A | 1/1994 | Taylor et al. | |
| 5,292,224 A | 3/1994 | Torii et al. | |
| 5,303,584 A | 4/1994 | Ogasawara et al. | |
| 5,303,731 A | 4/1994 | Vavra et al. | |
| 5,361,805 A | 11/1994 | Mayeux | |
| 5,368,062 A | 11/1994 | Okumura et al. | |
| 5,410,912 A | 5/1995 | Suzuki | |
| 5,439,026 A | 8/1995 | Moriya et al. | |
| 5,440,477 A | 8/1995 | Rohrberg et al. | |
| 5,460,204 A | 10/1995 | Rossi | |
| 5,488,915 A | 2/1996 | McNeill | |
| 5,488,925 A | 2/1996 | Kumada | |
| 5,529,088 A | 6/1996 | Asou | |
| 5,605,179 A | 2/1997 | Strong, Jr. et al. | |
| 5,653,259 A | 8/1997 | Ramstad | |
| 5,657,786 A | 8/1997 | DuRoss et al. | |
| 5,662,143 A | 9/1997 | Caughran | |
| 5,711,342 A | 1/1998 | Kazama et al. | |
| 5,713,582 A | 2/1998 | Swensen et al. | |
| 5,720,317 A | 2/1998 | Nimberger | |
| 5,730,181 A | 3/1998 | Doyle et al. | |
| 5,730,448 A | 3/1998 | Swensen et al. | |
| 5,732,744 A | 3/1998 | Barr | |
| 5,735,532 A | 4/1998 | Nolan et al. | |
| 5,735,533 A | 4/1998 | Nolan et al. | |
| 5,749,562 A | 5/1998 | Moller et al. | |
| 5,769,110 A | 6/1998 | Ohmi et al. | |
| 5,794,645 A | 8/1998 | Rohrberg et al. | |
| 5,819,782 A | 10/1998 | Itafuji | |
| 5,836,355 A | 11/1998 | Markulec et al. | |
| 5,860,676 A | 1/1999 | Brzezicki et al. | |
| 5,915,409 A | 6/1999 | Kaneko et al. | |
| 5,918,616 A * | 7/1999 | Sanfilippo et al. | 137/884 |
| 5,967,489 A | 10/1999 | Nakazawa et al. | |
| 5,975,590 A | 11/1999 | Cowan et al. | |
| 5,979,910 A | 11/1999 | Shinohara et al. | |
| 5,979,944 A | 11/1999 | Yokoyama et al. | |
| 5,983,933 A | 11/1999 | Ohmi et al. | |
| 5,984,318 A | 11/1999 | Kojima et al. | |
| 5,988,217 A * | 11/1999 | Ohmi et al. | 137/614.2 |
| 5,992,463 A | 11/1999 | Redemann et al. | |
| 6,007,108 A | 12/1999 | Braun | |
| 6,012,479 A | 1/2000 | Fukushima et al. | |
| 6,035,609 A * | 3/2000 | Evans et al. | 53/432 |
| 6,035,893 A | 3/2000 | Ohmi et al. | |
| 6,036,107 A | 3/2000 | Aspen et al. | |
| 6,039,360 A | 3/2000 | Ohmi et al. | |
| 6,048,041 A | 4/2000 | Mueller et al. | |
| 6,056,291 A | 5/2000 | Inagaki et al. | |
| 6,062,605 A | 5/2000 | Goshima et al. | |
| 6,068,016 A | 5/2000 | Manofsky, Jr. et al. | |
| 6,073,646 A * | 6/2000 | Kimura | 137/315.05 |
| 6,076,543 A | 6/2000 | Johnson | |
| 6,085,783 A | 7/2000 | Hollingshead | |
| 6,109,303 A * | 8/2000 | Itafuji et al. | 137/884 |
| 6,116,282 A | 9/2000 | Yamaji et al. | |
| 6,116,283 A | 9/2000 | Yamaji et al. | |
| 6,123,340 A | 9/2000 | Sprafka et al. | |
| 6,125,887 A * | 10/2000 | Pinto | 137/884 |
| 6,135,155 A | 10/2000 | Ohmi et al. | |
| 6,142,164 A * | 11/2000 | Wier et al. | 137/15.04 |
| 6,152,175 A | 11/2000 | Itoh et al. | |
| 6,170,890 B1 | 1/2001 | Ohmi et al. | |
| 6,186,177 B1 * | 2/2001 | Maher | 137/884 |
| 6,209,571 B1 | 4/2001 | Itoh et al. | |
| 6,231,260 B1 * | 5/2001 | Markulec et al. | 403/24 |
| 6,241,254 B1 | 6/2001 | Gromyko et al. | |
| 6,257,270 B1 | 7/2001 | Ohmi et al. | |
| 6,257,592 B1 | 7/2001 | Hasizawa et al. | |
| 6,260,581 B1 | 7/2001 | Hollingshead | |
| 6,260,854 B1 | 7/2001 | Lemon | |
| 6,273,139 B1 | 8/2001 | Ohmi et al. | |
| 6,283,155 B1 | 9/2001 | Vu | |
| 6,293,310 B1 | 9/2001 | Redemann et al. | |
| 6,298,881 B1 | 10/2001 | Curran et al. | |
| 6,302,141 B1 | 10/2001 | Markulec et al. | |
| 6,349,744 B1 | 2/2002 | Grosshart | |
| 6,361,081 B1 | 3/2002 | Yokoyama et al. | |
| 6,363,958 B1 | 4/2002 | Ollivier | |
| 6,374,859 B1 | 4/2002 | Vu et al. | |
| 6,382,238 B2 | 5/2002 | Ishii et al. | |
| 6,382,257 B2 | 5/2002 | Mead et al. | |
| 6,394,138 B1 | 5/2002 | Vu et al. | |
| 6,408,879 B1 | 6/2002 | Ohmi et al. | |
| 6,422,264 B2 | 7/2002 | Ohmi et al. | |
| 6,450,200 B1 | 9/2002 | Ollivier | |
| 6,502,601 B2 | 1/2003 | Eidsmore et al. | |
| 6,523,570 B2 | 2/2003 | Weiss et al. | |
| 6,546,960 B1 | 4/2003 | Rohrberg et al. | |
| 6,546,961 B2 | 4/2003 | Fukushima | |
| 6,615,871 B2 | 9/2003 | Ohmi et al. | |
| 6,629,546 B2 | 10/2003 | Eidsmore et al. | |
| 6,634,385 B2 | 10/2003 | Symington | |
| 6,640,835 B1 | 11/2003 | Rohrberg et al. | |
| 6,644,353 B1 | 11/2003 | Eidsmore | |
| 6,729,353 B2 | 5/2004 | Nguyen | |
| 6,736,370 B1 | 5/2004 | Crockett et al. | |
| 6,874,538 B2 | 4/2005 | Bennett | |
| 6,953,048 B2 * | 10/2005 | Chuh | 137/269 |
| 7,018,940 B2 | 3/2006 | Dunham | |
| 7,048,008 B2 | 5/2006 | Milburn | |
| 7,213,618 B2 | 5/2007 | Milburn et al. | |
| 7,258,139 B2 * | 8/2007 | Perusek et al. | 137/884 |
| 7,448,276 B2 | 11/2008 | Crockett et al. | |
| 7,459,003 B2 | 12/2008 | Crockett et al. | |
| 8,042,573 B2 * | 10/2011 | Tokuda et al. | 137/884 |
| 2003/0079686 A1 | 5/2003 | Chen et al. | |
| 2003/0106597 A1 | 6/2003 | Ichikawa et al. | |
| 2004/0129324 A1 | 7/2004 | Vu | |
| 2005/0028878 A1 | 2/2005 | Reid, II et al. | |
| 2005/0266582 A1 | 12/2005 | Modlin et al. | |
| 2008/0166884 A1 | 7/2008 | Nelson et al. | |

FOREIGN PATENT DOCUMENTS

| | | |
|---|---|---|
| EP | 0366909 B1 | 5/1990 |
| EP | 0777259 A1 | 6/1997 |
| EP | 0837278 A1 | 4/1998 |
| EP | 0754896 B1 | 5/2002 |
| EP | 0908929 B1 | 1/2004 |
| GB | 1533202 | 11/1978 |
| GB | 2178139 A | 2/1987 |
| JP | 2-261983 | 10/1990 |
| JP | 5-172265 | 7/1993 |
| JP | 06241400 | 8/1994 |
| JP | 7-071403 | 3/1995 |
| JP | 7-074113 | 3/1995 |
| JP | 7-286720 | 10/1995 |
| JP | 08227836 | 9/1996 |
| JP | 2865644 | 3/1999 |
| JP | 11351500 A | 12/1999 |
| WO | WO 9825058 | 6/1998 |
| WO | WO 99/45302 A1 | 9/1999 |
| WO | WO 01/16512 A1 | 3/2001 |
| WO | WO 2004/088772 A2 | 10/2004 |

* cited by examiner

FLUID DELIVERY SUBSTRATES FOR BUILDING REMOVABLE STANDARD FLUID DELIVERY STICKS

RELATED APPLICATIONS

This application claims priority under 35 U.S.C. §119(e) to U.S. Provisional Application Ser. No. 61/178,286, entitled "FLUID DELIVERY SUBSTRATES FOR BUILDING REMOVABLE STANDARD FLUID DELIVERY STICKS," filed on May 14, 2009, which is herein incorporated by reference in its entirety.

BACKGROUND OF THE INVENTION

1. Field of the Invention

The present invention is directed to fluid delivery systems, and more particularly to surface mount fluid delivery systems for use in the semiconductor processing and petrochemical industries.

2. Discussion of the Related Art

Fluid delivery systems are used in many modern industrial processes for conditioning and manipulating fluid flows to provide controlled admittance of desired substances into the processes. Practitioners have developed an entire class of fluid delivery systems which have fluid handling components removably attached to flow substrates containing fluid pathway conduits. The arrangement of such flow substrates establishes the flow sequence by which the fluid handling components provide the desired fluid conditioning and control. The interface between such flow substrates and removable fluid handling components is standardized and of few variations. Such fluid delivery system designs are often described as modular or surface mount systems. Representative applications of surface mount fluid delivery systems include gas panels used in semiconductor manufacturing equipment and sampling systems used in petrochemical refining. The many types of manufacturing equipment used to perform process steps making semiconductors are collectively referred to as tools. Embodiments of the present invention relate generally to fluid delivery systems for semiconductor processing and specifically to surface mount fluid delivery systems. Aspects of the present invention are applicable to surface mount fluid delivery system designs whether of a localized nature or distributed around a semiconductor processing tool.

Industrial process fluid delivery systems have fluid pathway conduits fabricated from a material chosen according to its mechanical properties and considerations of potential chemical interaction with the fluid being delivered. Stainless steels are commonly chosen for corrosion resistance and robustness, but aluminum or brass may be suitable in some situations where cost and ease of fabrication are of greater concern. Fluid pathways may also be constructed from polymer materials in applications where possible ionic contamination of the fluid would preclude using metals. The method of sealingly joining the fluid handling components to the flow substrate fluid pathway conduits is usually standardized within a particular surface mount system design in order to minimize the number of distinct part types. Most joining methods use a deformable gasket interposed between the fluid component and the flow substrate to which it is attached. Gaskets may be simple elastomeric O-Rings or specialized metal sealing rings such as seen in U.S. Pat. No. 5,803,507 and U.S. Pat. No. 6,357,760. Providing controlled delivery of high purity fluids in semiconductor manufacturing equipment has been of concern since the beginning of the semiconductor electronics industry and the construction of fluid delivery systems using mostly metallic seals was an early development. One early example of a suitable bellows sealed valve is seen in U.S. Pat. No. 3,278,156, while the widely used VCR® fitting for joining fluid conduits is seen in U.S. Pat. No. 3,521,910, and a typical early diaphragm sealed valve is seen in U.S. Pat. No. 5,730,423 for example. The recent commercial interest in photovoltaic solar cell fabrication, which has less stringent purity requirements than needed for making the newest microprocessor devices, may bring a return to fluid delivery systems using elastomeric seals.

A collection of fluid handling components assembled into a sequence intended for handling a single fluid species is frequently referred to as a gas stick. The equipment subsystem comprised of several gas sticks intended to deliver process fluid to a particular semiconductor processing chamber is often called a gas panel. During the 1990s several inventors attacked problems of gas panel maintainability and size by creating gas sticks wherein the general fluid flow path is comprised of passive metallic structures, containing the conduits through which process fluid moves, with valves and like active (and passive) fluid handling components removably attached thereto. The passive fluid flow path elements have been variously called manifolds, substrates, blocks, and the like, with some inconsistency even within the work of individual inventors. This disclosure chooses to use the terminology flow substrate to indicate fluid delivery system elements which contain passive fluid flow path(s) that may have other fluid handling devices mounted there upon.

Many semiconductor manufacturing processes have fluid delivery requirements amenable to quite regular gas panel designs. Such gas panels are comprised of several nearly identical gas sticks conducting fluid in a generally longitudinal direction, from stick inlet to stick outlet, the sticks differing mainly with regard to particular fluid species, flow rates, and such other matters. Selectively chosen transverse connections between gas sticks are used to combine fluid flows for delivery to the processing chamber, or provide purging and vacuum connections, or similar functions known in the art. A process equipment manufacturing environment having recurring need for large quantities, but relatively few types, of gas sticks gives rise to a material management concept sometimes referred to as "standard stick" designs. Embodiments of the present invention are directed to lower cost flow substrate and standard stick bracket designs which enhance the ease of installing, or replacing, complete gas stick subassemblies in a gas panel subsystem while making standard stick designs less expensive.

Some examples of regularized gas panels are described in U.S. Pat. No. 5,836,355, U.S. Pat. No. 6,283,155, and U.S. Pat. No. 6,302,141 wherein the component bearing substrate block parts have component ports on one surface, and one or more manifold ports on the opposite surface, whereby transverse connection between gas sticks is provided through a second lower layer of block parts in sealing registration with the manifold port(s). In these designs it is not feasible to remove a single gas stick intact from the gas panel because one or more active components must first be removed to allow access to the fasteners which couple together the first and second layers of substrate blocks. A similar problem exists in the gas stick of U.S. Pat. No. 6,769,463 which uses a welded assembly of fluid conduits to provide the transverse connecting second layer instead of a bolted assembly of blocks.

U.S. Pat. No. 5,992,463 describes a regularized gas panel wherein the component bearing manifold (substrate) parts have all fluid ports only in a common plane whereby transverse connection between gas sticks is provided through bridging components directly attached to ports in that common plane as described in U.S. Pat. No. 6,435,215. Replacement of a gas stick requires removal of the appropriate bridging component(s) but does not necessitate disruption of the gas stick itself. Similar use of bridging components may be seen in U.S. Pat. No. 6,293,310, U.S. Pat. No. 6,374,859, and U.S. Pat. No. 6,394,138 for example.

SUMMARY OF THE INVENTION

Embodiments of the present inventive flow substrate and standard stick bracket designs minimize the total number of fluid conduit ports and seals needed to build standardized fluid delivery sticks. Each flow substrate has a component attachment surface with one or more component conduit ports and an associated plurality of fastener apertures. Some flow substrates incorporate a transverse manifold connection conduit port on a surface opposite the component attachment surface and fastener apertures associated with the transverse manifold connection conduit port are accessible adjacent to installed components. Transverse connection between fluid delivery sticks preferably uses a welded assembly of fluid conduits to provide a transverse connecting lower second layer which is sealingly retained by fasteners inserted from above through the apertures associated with the transverse manifold connection conduit port.

The flow substrates for each fluid delivery stick are securely fastened to a standardized stick bracket providing firm mechanical alignment and thereby obviating need for any interlocking flange structures among the flow substrates. The absence of interlocking flange structures provides reduced cost through lessened machining and similarly less use of high purity grade metal constituting the flow substrates. Each standardized fluid delivery stick arrangement can be assembled and tested as a rigid free-standing subassembly before installation in the fluid delivery panel. Installation of the standardized stick only requires insertion and tightening of fasteners associated with the transverse manifold connection conduit port(s) and attachment of the standardized stick bracket to the fluid delivery panel backplane. Likewise, removal and replacement of a standardized stick involves only the complete unit without need to remove any individual element of the standardized stick.

The standardized stick bracket secures the standard stick to the fluid delivery panel backplane and thereby holds adjacent standardized sticks in correct transverse alignment to enable connection between bottom located flow substrate transverse manifold connection conduit ports and corresponding ports in the underlying transverse oriented manifold(s).

The standardized stick bracket is preferably unitary and can be formed of folded heavy gage sheet metal, extruded or die cast aluminum, or similar suitable structural design. The flow substrate configurations may be adjusted for use with valves having symmetric port placement (e.g., W-Seal™ devices) or asymmetric port placement (e.g., standard "C-Seal" devices) on the valve (or other fluid handling component) mounting face, but asymmetric designs are mostly shown herein because such devices are most commonly available in the semiconductor equipment marketplace. A further cost saving aspect of the inventive substrates is the use of only 2-port valves to accomplish all fluid routing functions thereby lowering standardized stick cost by avoiding more expensive 3-port valves.

The flow substrates of the inventive standard stick design are purposely made with all ports and conduits having their corresponding axis of symmetry normal to the plane of the substrate face which is respectively pierced. Such flow substrate designs may be machined using less sophisticated machine tools than required for the angle drilled holes seen in U.S. Pat. No. 6,394,138 for example. Injection molding and die casting fabrication methods will similarly be simplified by having all passages normal to the exterior faces. Fluid pathway conduits within a particular flow substrate need not be of identical cross sectional area and may be optimized according to function.

In accordance with one aspect of the present invention, a fluid delivery stick is provided. The fluid delivery stick comprises a fluid delivery stick bracket, a plurality of flow substrates disposed on a surface of the fluid delivery stick bracket, and a manifold. The plurality of flow substrates includes at least one flow substrate having a flow substrate body and a plurality of component conduit ports formed in a component attachment surface of the flow substrate body. The plurality of component conduit ports includes first and second component conduits ports that are fluidly connected by a first fluid pathway formed in the flow substrate body and third and fourth component conduit ports that are fluidly connected by a second fluid pathway formed in the flow substrate body. The first and second fluid pathways extend between the first and second component conduit ports and the third and fourth component conduit ports along a first axis. The at least one flow substrate further includes a manifold connection conduit port formed in a connection attachment surface of the flow substrate body that opposes the component attachment surface, and a third fluid pathway formed in the flow substrate body that fluidly connects one of the second and third component conduit ports to the manifold connection conduit port. The third fluid pathway extends between the one of the second and third component conduit ports and the manifold connection conduit port along a second axis that is generally transverse to the first axis. The manifold has a manifold body and a manifold conduit port formed in a substrate attachment surface of the manifold body. The manifold includes a tube stub connection extending from the manifold body in a direction parallel to one of the first axis and the second axis that is fluidly connected to the manifold conduit port by a manifold fluid pathway formed in the manifold body. The manifold is constructed and arranged to be suspended below the at least one substrate and fastened to the flow substrate body by a pair of fasteners that are inserted through the flow substrate body from the component attachment surface of the flow substrate body and that maintain the manifold conduit port in sealing engagement with the manifold connection port.

In accordance with one embodiment, the manifold is further constructed and arranged to be suspended below the at least one substrate without contacting the fluid delivery stick bracket. In accordance with a further aspect of this embodiment, the fluid delivery stick further comprises a fluid handling component fastened to the component attachment surface of the at least one substrate, the fluid handling component having a first component port in sealing engagement with the second component conduit port and a second component port in sealing engagement with the third component conduit port. In accordance with this embodiment, the fluid delivery stick bracket is mounted to a support surface by a plurality of fasteners, and the fluid delivery stick bracket, the fluid handling component, and each of the plurality of flow substrates can be dismounted from the support surface as an integral unit by removing only the plurality of fasteners and the pair of fasteners that maintain the manifold conduit port in sealing engagement with the manifold connection port.

In accordance with an aspect of the present invention, the manifold includes a plurality of tube stub connections extending from the manifold body and fluidly connected to the manifold conduit port by the manifold fluid pathway. The plurality of tube stub connections includes a first tube stub connection extending from the manifold body in a direction parallel to the first axis and a second tube stub connection extending from the manifold body in a direction parallel to the second axis.

In accordance with another aspect of the present invention, the first and second fluid pathways can have a first diameter and the third fluid pathway can have a second diameter that is larger than the first diameter.

In accordance with yet another aspect of the present invention, each of the plurality of component conduit ports is formed by machining from the component attachment surface into the flow substrate body, and each of the first and second fluid pathways is formed by machining from the connection attachment surface.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
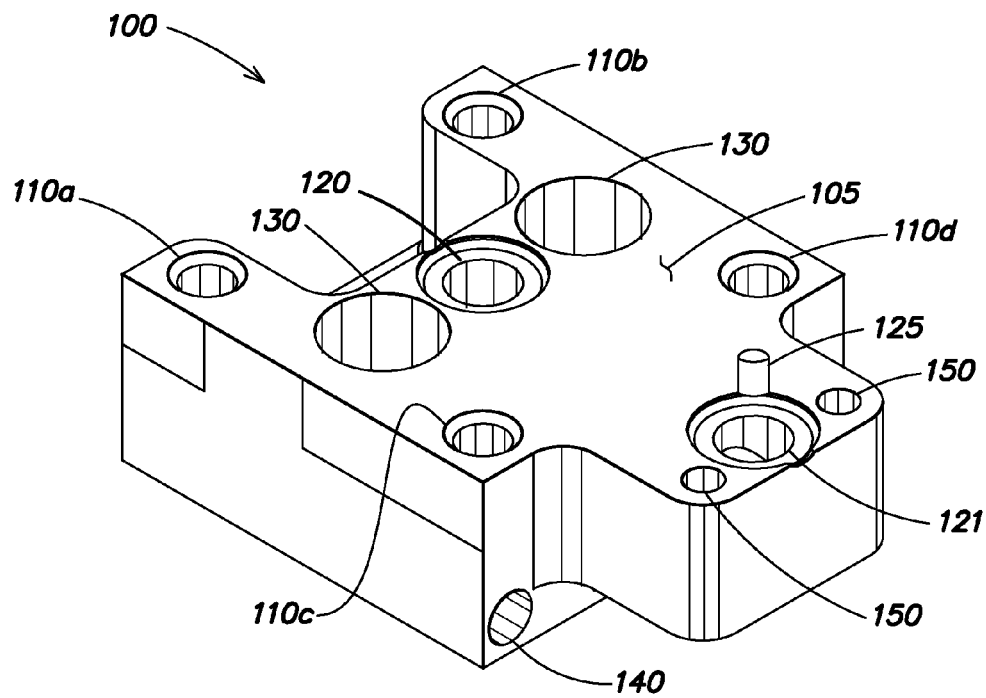
FIG. 1A illustrates a top elevation view of a conventional modular fluid flow substrate design.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

It should be appreciated that the fluid materials manipulated in the fluid delivery panel standardized sticks of the present invention may be a gaseous, liquid, or vaporous substance that can change between liquid and gas phase dependent upon the specific temperature and pressure of the substance. Representative fluid substances may be a pure element such as argon (Ar), a vaporous compound such as boron trichloride (BCl3), a mixture of normally liquid silicon tetrachloride (SiCl4) in carrier gas, or an aqueous reagent.

Figure 1B:
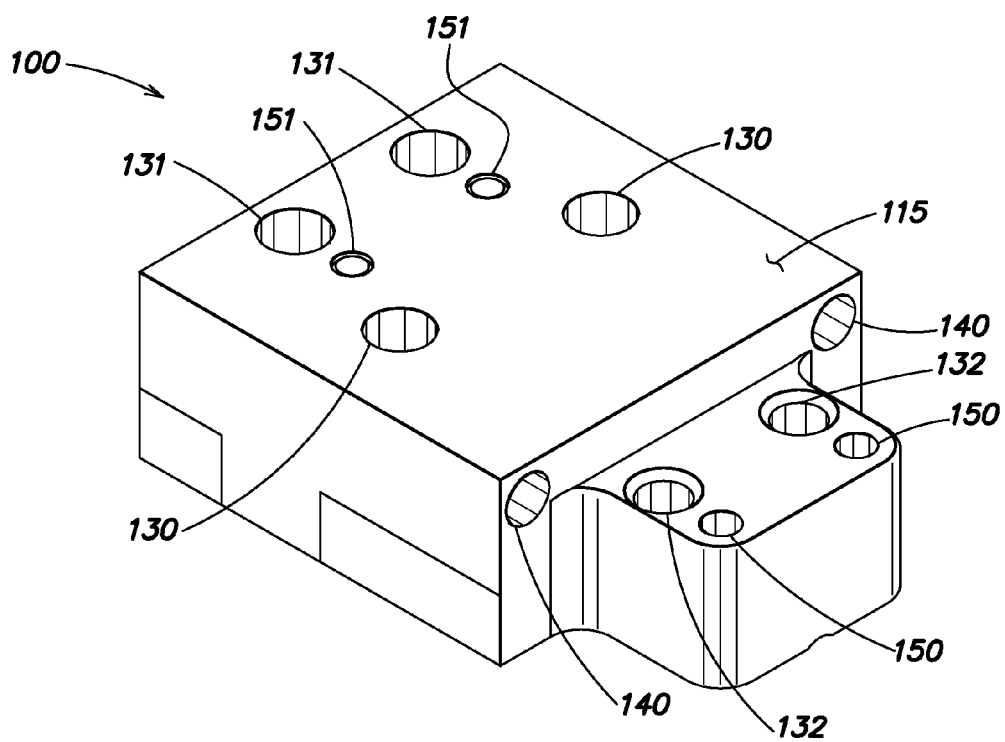
FIG. 1B illustrates a bottom elevation view of the conventional modular fluid flow substrate design illustrated in FIG. 1A.

FIG. 1 illustrates a conventional modular fluid flow substrate design such as described in U.S. Pat. No. 6,394,138, which is incorporated by reference herein, in which FIG. 1A is an elevation view of the top surface of the flow substrate and FIG. 1B is an elevation view of the bottom surface of the flow substrate. Adjacent flow substrates 100 are interlocked to one another using a tongue and pocket design. This flow substrate design is commonly referred to in the semiconductor processing industry as "K1s."

As shown, the flow substrate 100 is formed from a solid block of material (such as stainless steel) and includes a component attachment surface 105 to which a fluid handling component (such as a valve, pressure transducer, filter, regulator, etc.) is attached. A single V-shaped (or U-shaped) fluid passageway (not shown) extends between component conduit ports 120 and 121. The port of a first fluid handling component is fluidly connected to component conduit port 120 using fasteners that extend through the base of the first fluid handling component and into fastening apertures 110a, 110b, 110c, and 110d. As shown in FIG. 1A, the flow substrate 100 includes a pair of counter-bored mounting holes 130 that extend through the flow substrate for securing the flow substrate 100 to a support surface, a first pair of apertures 150 each to receive a respective dowel pin (not shown) that is used to align one flow substrate 100 with another adjacent flow substrate, and a helium leak port 125.

As can be seen in FIG. 1B, counter-bored mounting holes 130 extend through the flow substrate to the surface 115 opposite the component attachment surface 105. A pair of attachment holes 131 is formed in a lower surface of the pocket region (not visible in FIG. 1A) of the flow substrate 100 and extend through the flow substrate 100 to the surface 115. A pair of internally threaded attachment bores 132 is formed in an under-surface of the tongue region of the flow substrate 100 each to accommodate the shank of a threaded fastener which extends through aperture 131 and secures one flow substrate to another adjacent flow substrate. A second pair of apertures 151 is formed in the lower surface of the pocket region, each to receive a respective dowel pin (not shown) that is used to align one flow substrate 100 with another adjacent flow substrate. The port of a second fluid handling component is fluidly connected to component conduit port 121 using fasteners that extend through the base of the second fluid handling component and into corresponding fastening apertures 110a, 110b, 110c, and 110d, of the adjacent second flow substrate. The flow substrate 100 also includes a pair of apertures 140 that are drilled completely through the flow substrate in a longitudinal direction and which may receive a cartridge-type heater, as known in the art.

The design of the fluid flow substrate described with respect to FIG. 1 above has been commercially successful and incorporates a number of features that allow it to be used in a number of different ways and in a wide variety of installations. However, many of these features may not be used in certain installations, and thus add cost and complexity. For example, the interlocking tongue and pocket design uses a great deal of raw material (e.g., high quality stainless steel) that is ultimately machined away. Moreover, many of the features, such as the counter-bored mounting holes 130 and mounting holes 131 (with associated bores 132) that permit the flow substrates to be self supporting and interlocking come with an associated cost of machining that may not be used in certain installations. Other features, such as the apertures 150, 151 to receive dowel pins add machining and assembly costs, and the apertures 140 to receive a cartridge heater may not be used in certain installations. Further, although not shown in FIG. 1, this design makes frequent use of 3-port valves, which are more expensive to purchase and assemble relative to the more common and less expensive 2-port valves.

Embodiments of Applicant's invention are directed to a modular surface mount fluid delivery system that overcomes one or more of the disadvantages noted above. In accordance with one aspect of the present invention, a modular surface mount fluid delivery system is provided that includes at least one modular surface mount fluid delivery stick, but more typically a plurality of modular surface mount fluid delivery sticks. Each modular surface mount fluid delivery stick includes a plurality of modular surface mount flow substrates, at least one, and more typically, a plurality of modular manifolds, and a mounting bracket to which the flow substrates are mounted. In accordance with one aspect of the present invention, the mounting bracket may have a standardized mounting-hole pattern that permits its use with a variety of flow substrates in an interchangeable manner. For example, in accordance with one embodiment, the standardized mounting bracket may be used with flow substrates having component ports situated in different positions (e.g., asymmetric port placement versus symmetric port placement), different numbers of component conduit ports, different numbers of fluid handling component positions, and different numbers of manifold connection conduit ports in an interchangeable manner. These and other aspects of the present invention are now described in detail with respect to FIGS. 2-11 below.

Figure 2A:
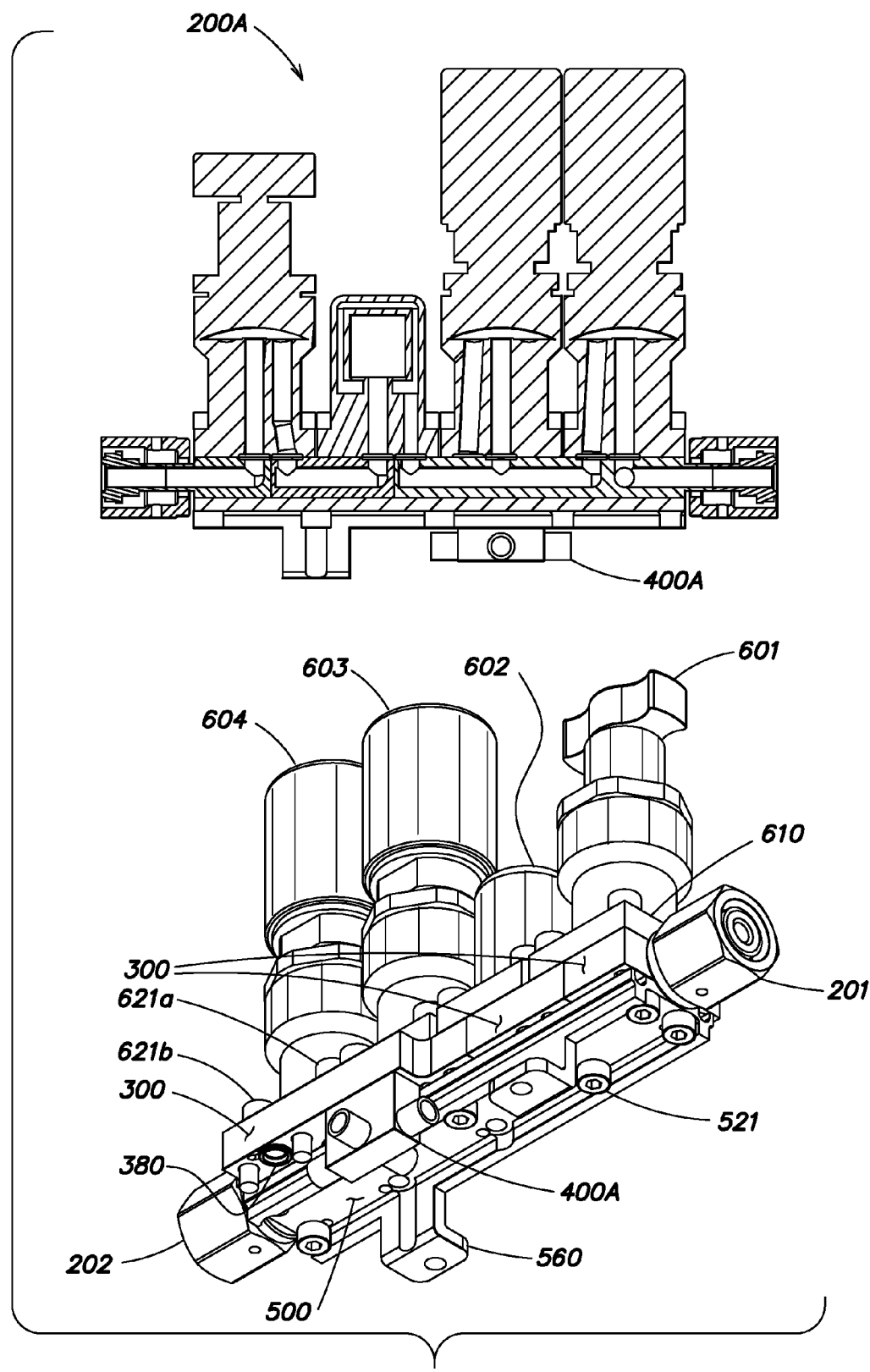
FIG. 2A illustrates a cross-sectional view and an isometric view of a standardized fluid delivery stick in accordance with one embodiment of the present invention.

FIG. 2A illustrates a cross-sectional view and an isometric view of a standardized fluid delivery stick in accordance with one embodiment of the present invention. As depicted in FIG. 2A, the standardized fluid delivery stick 200A includes a plurality of fluid handling components 60X (i.e., 601, 602, 603, 604), mounted to a plurality of modular surface mount flow substrates 300, which are in turn mounted to a standardized fluid delivery stick bracket 500. The plurality of fluid handling components may include nearly any two-port fluid handling component selected from among valves (manual, pneumatic, etc.), pressure sensors, pressure transducers, pressure regulators, filters, mass flow controllers (not shown), etc. As depicted, each of the plurality of fluid handling components is mounted to respective flow substrates 300 by a plurality of threaded component mounting fasteners 621a, 621b, 621c, 621d (621c and 621d are not visible in FIG. 2A) that pass through apertures in a base 610 of the respective fluid handling component 60X and are received in threaded component mounting apertures (not visible in FIG. 2A) formed in a component attachment surface of the respective flow substrates. The flow substrates themselves are mounted to the standardized fluid delivery stick bracket 500 from below by a plurality of threaded flow substrate mounting fasteners 521 that pass through flow substrate mounting apertures in the standardized fluid delivery stick bracket 500 and are received in threaded flow substrate mounting apertures in a connection attachment surface of the respective flow substrates. In the embodiment depicted in FIG. 2A, the standardized fluid delivery stick bracket 500 includes aligned flow substrate mounting apertures as described further in detail with respect to FIG. 11B. The standardized fluid delivery stick 200A passes fluid in a longitudinal direction from the stick inlet 201 to a stick outlet 202.

In accordance with an aspect of the present invention, the standardized fluid delivery stick 200A includes a modular manifold 400A that mounts to a connection attachment surface of a flow substrate and is specifically adapted to route fluid in a transverse direction (defined herein as a direction substantially orthogonal to the longitudinal direction in a plane that is parallel to the component attachment surface of the flow substrates). In the embodiment depicted in FIG. 2A, in addition to being able to route fluid in a transverse direction, the modular manifold 400A is also capable of routing fluid in the longitudinal direction where the longitudinal flow path is physically located between adjacent standardized fluid delivery sticks in an area that, in typical fluid delivery panels, is free from other obstructions. This first type of modular manifold (termed type A or series A) which is capable of additionally routing fluid in a longitudinal direction in a region between adjacent fluid delivery sticks is referenced 400A in FIG. 2A and in FIG. 3A, and is referenced 400A' in FIG. 9A (where the use of the prime symbol indicates the manifolds are adapted for fluid handling components having symmetric port placement rather than asymmetric port placement as described further below). In the illustration of FIG. 2A, manifold connection conduit port 380 is visible in the isometric view of the standardized fluid delivery stick 200A.

Figure 2B:
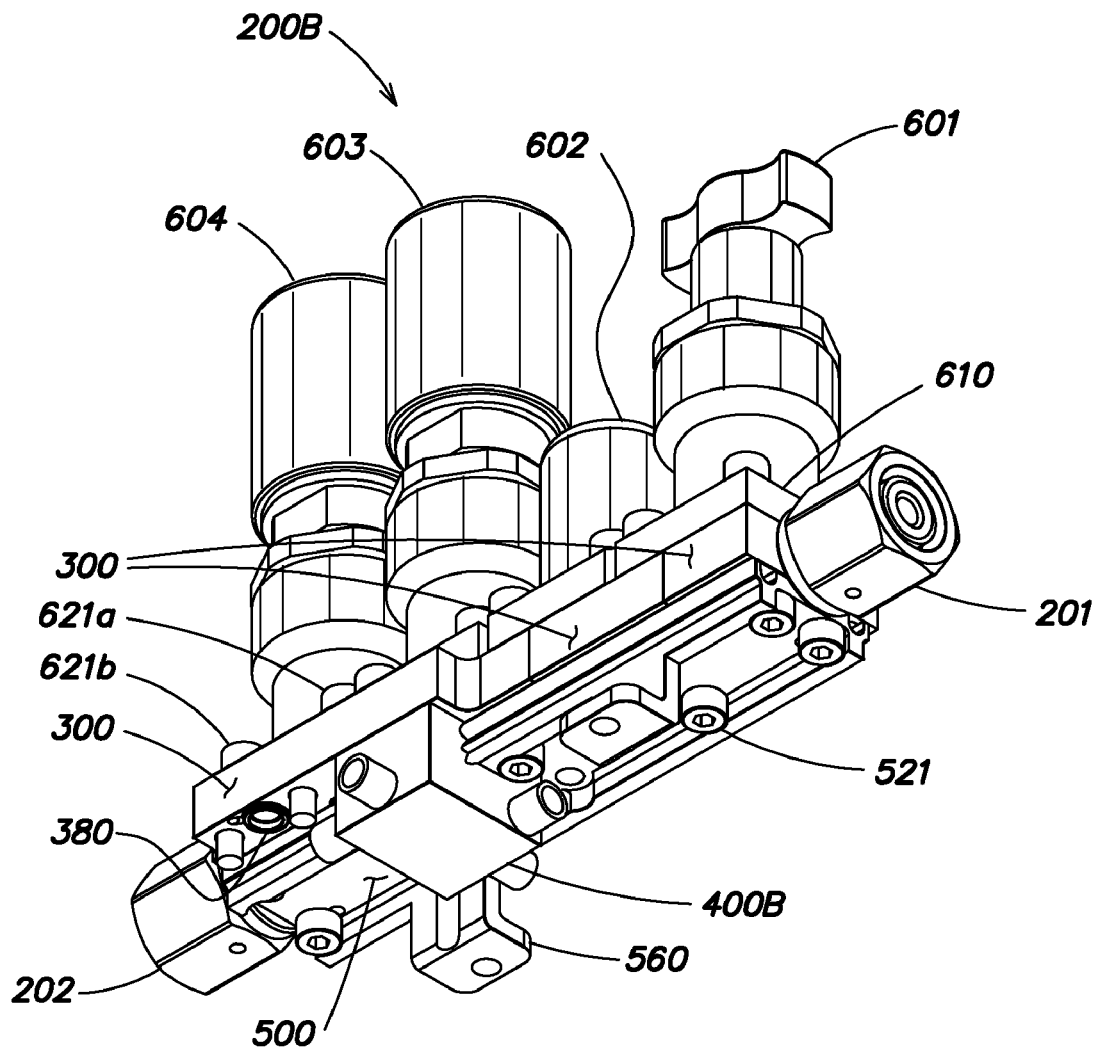
FIG. 2B illustrates an isometric view of a standardized fluid delivery stick in accordance with another embodiment of the present invention.

FIG. 2B illustrates an isometric view of a standardized fluid delivery stick in accordance with another embodiment of the present invention. The standardized fluid delivery stick 200B depicted in FIG. 2B is functionally identical to the standardized fluid delivery stick 200A described above with respect to FIG. 2A, in all but one respect; for this reason, the reference numerals used in FIG. 2A correspond identically to those used in FIG. 2A, with one exception. In contrast to the first type of manifold 400A of FIG. 2A, a second type of modular manifold 400B is used instead. Like the first type of modular manifold 400A, the second type of manifold 400B mounts to a connection attachment surface of a flow substrate and is specifically adapted to route fluid in a transverse direction (i.e., substantially orthogonal to the longitudinal direction defined between the inlet 201 and the outlet 202 of the stick in a plane that is parallel to the component attachment surface of the flow substrates). Further, like the first type of manifold 400A, the second type of manifold 400B is also capable of routing fluid in a longitudinal direction that is generally parallel to the longitudinal direction defined between the inlet 201 and the outlet 202 of the stick. However, in contrast to the first type of manifold 400A in which the longitudinal flow path is physically located between adjacent standardized fluid delivery sticks, the longitudinal flow path provided by the second type of manifold 400B is physically located below the standardized fluid delivery stick bracket 500. For this reason, the longitudinal path may extend from the inlet 201 to the outlet 202 of the fluid delivery stick and beyond, without any interference with the mounting feet 560 of the standardized fluid delivery stick bracket 500.

Figure 3A:
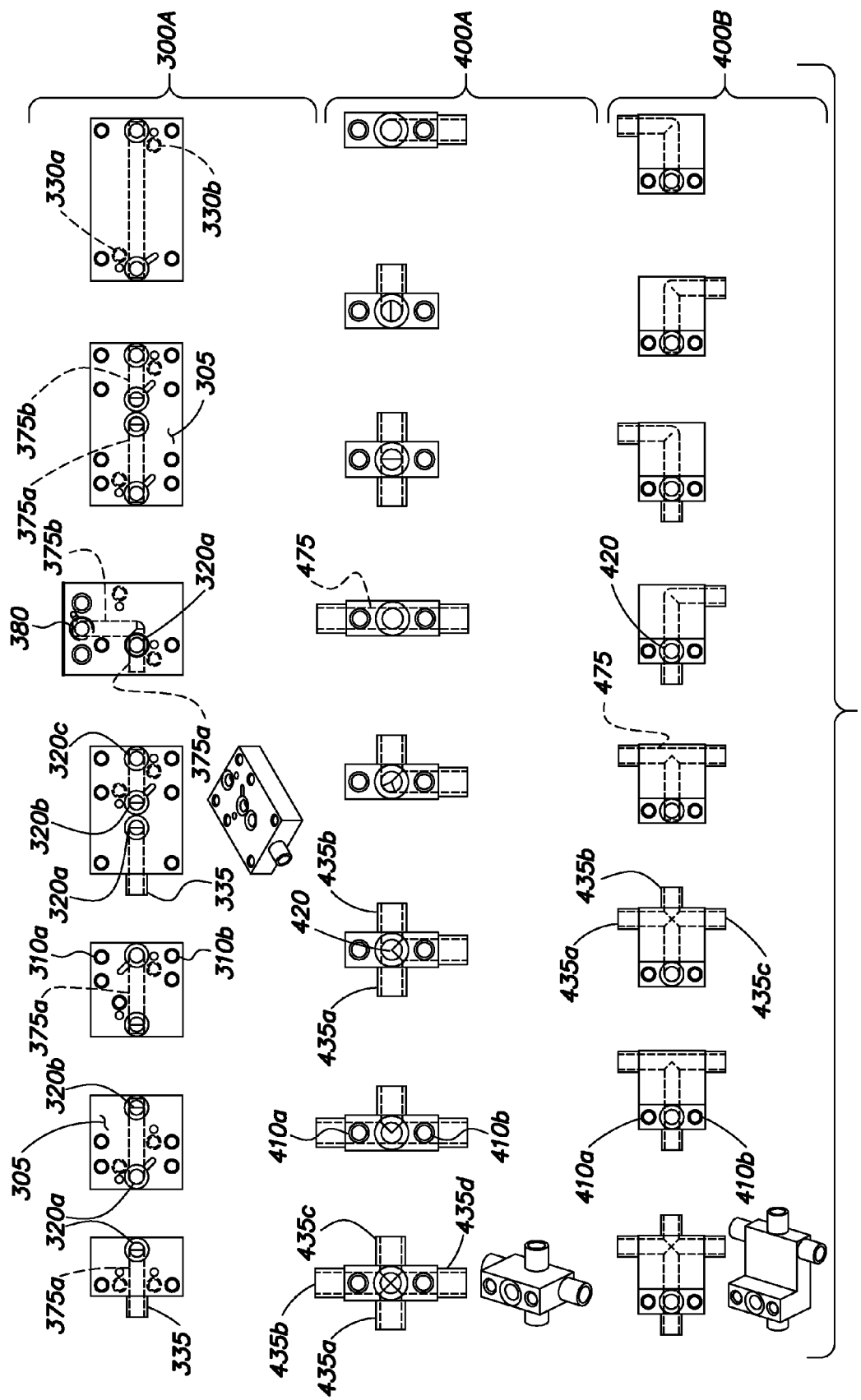
FIG. 3A illustrates a collection of modular flow substrates and modular manifolds in accordance with a first embodiment of the present invention for use with fluid handling components having asymmetric port placement (e.g., standard C-seal components)

FIG. 3A illustrates a collection of modular flow substrates and modular manifolds in accordance with a first embodiment of the present invention for use with fluid handling components having asymmetric port placement (e.g., C-seal components) in which one of the ports of the fluid handling component is axially aligned with the center of the component and the other is situated off axis. (See, for example, the cross-sectional (i.e., upper) drawing in FIG. 2A in which each of the fluid handling components 60X has such an asymmetric port placement). As details of the various modular flow substrates and modular manifolds depicted in FIG. 3A are described more fully in detail with respect to other figures below, only a general description of FIG. 3A is provided herein.

The top row of FIG. 3A illustrates plan and elevation views of various flow substrates 300A in which the component conduit ports 320a, 320b, 320c formed in the component attachment surface 305 are arranged to fluidly communicate with fluid handling components having asymmetric port placement. A representative elevation view is shown in FIG. 3A immediately below the fourth example flow substrate plan view. Also formed in component attachment surface 305 are component mounting apertures 310a, 310b that are used to receive a threaded fastener (621a, 621b in FIGS. 2A and 2B) that mount a fluid handling component 60X in sealing engagement with component conduit ports 320 of the flow substrate.

As illustrated, the flow substrate 300A may include a tube stub connection 335 that would typically be fluidly connected (for example, by welding) to a source or sink of process fluid, and which would typically form either the first or last flow substrate 300A in a fluid delivery stick. Shown in dotted line form are fluid pathways 375a, 375b that are formed within the body of the flow substrate and may be used to fluidly connect a first component conduit port 320a to a second component conduit port 320b, to connect a tube stub connection 335 to a first component conduit port 320a, to connect a component conduit port 320a to a manifold connection conduit port 380 (shown in dotted line form to indicate it is disposed on the surface opposing the component attachment surface 305). Also visible in dotted line form are the substrate mounting apertures 330a, 330b which are also disposed on the surface of the flow substrate opposing the component attachment surface 305.

The second row of FIG. 3A illustrates a variety of modular manifolds of the first type 400A that mount to a connection attachment surface of a flow substrate, that route fluid in a transverse direction, and that, in addition to being able to route fluid in a transverse direction, may also be capable of routing fluid in a longitudinal direction, where the longitudinal flow path is physically located between adjacent standardized fluid delivery sticks. A representative elevation view is shown in FIG. 3A immediately below the first example modular manifold plan view. Shown in FIG. 3A are the one or more tube stub connections 435a, 435b, 435c, etc., the manifold conduit port 420, and the fluid pathway 475 of the manifold. The manifolds 400A may be fluidly connected to one another, for example, by welding, with or without intervening structures (e.g., straight lengths of tubing) to form nearly any fluid routing path.

The third row of FIG. 3A illustrates a variety of modular manifolds of the second type 400B that mount to a connection attachment surface of a flow substrate, that route fluid in a transverse direction, and that, in addition to being able to route fluid in a transverse direction, may also be capable of routing fluid in a longitudinal direction, where the longitudinal flow path is physically located below the standardized fluid delivery stick bracket 500. A representative elevation view is shown in FIG. 3A immediately below the first example modular manifold plan view. Shown in FIG. 3A are the one or more tube stub connections 435a, 435b, 435c, etc., the manifold port 420, and the fluid pathway 475 of the manifold. A plurality of threaded mounting apertures 410a and 410b are formed to receive a threaded fastener that extends through a flow substrate from above and pull the manifold into sealing engagement with the connection attachment surface of the substrate. The manifolds 400B may be fluidly connected to one another, for example, by welding, with or without intervening structures (e.g., straight lengths of tubing) to form nearly any fluid routing path.

Figure 3B:
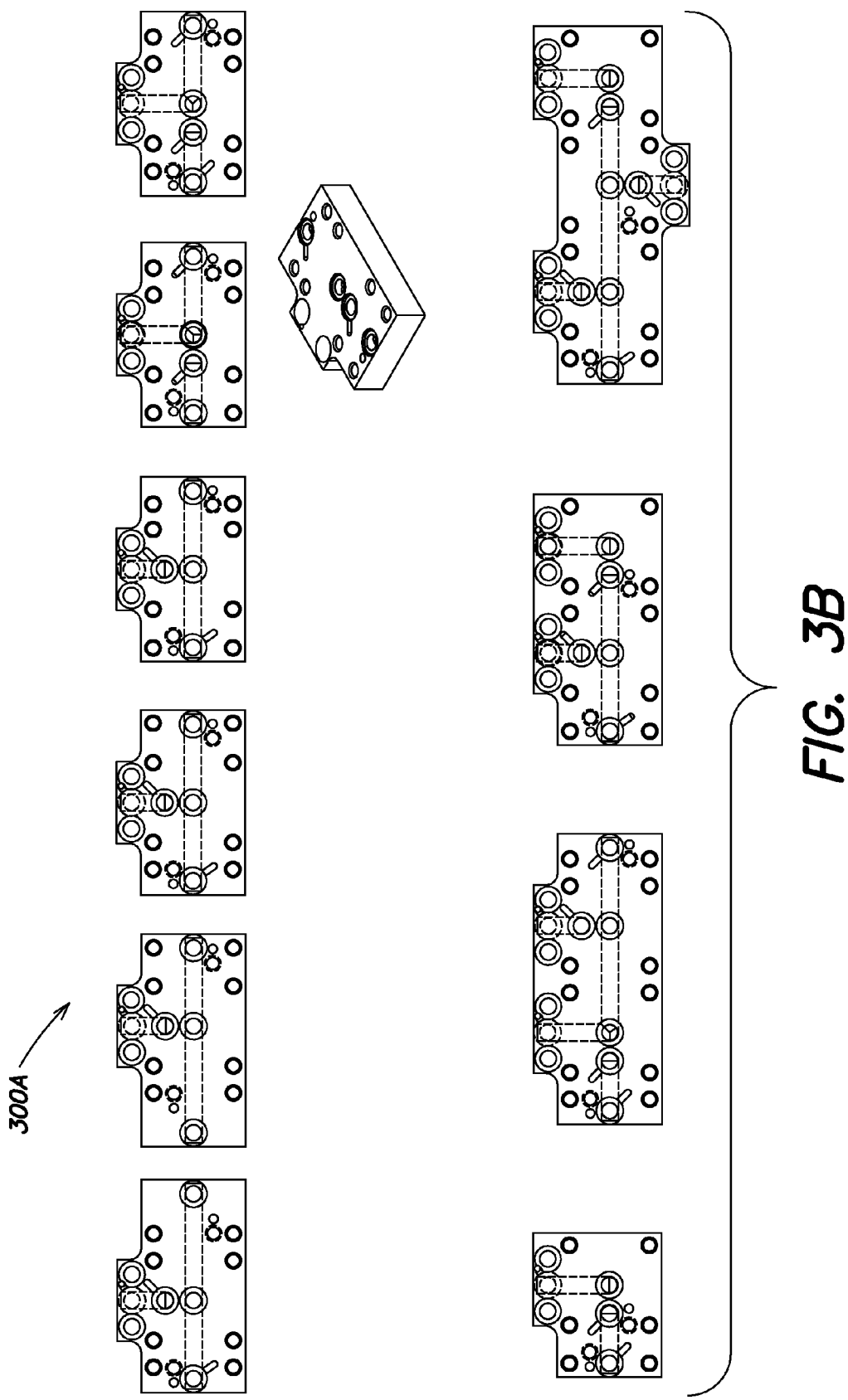
FIG. 3B illustrates plan and elevation views of a variety of different flow substrates in accordance with the embodiment of FIG. 3A for use at higher fluid flow rates.

FIG. 3B illustrates plan and elevation views of a variety of different flow substrates 300A in accordance with the embodiment of FIG. 3A for use at higher fluid flow rates. It should be appreciated that unlike K1s substrates, flow substrates in accordance with the present invention may include multiple distinct fluid pathways 375, such as illustrated, for example, with respect to the top-right substrate in FIG. 3B. Details of each of the various flow substrates 300A of FIG. 3B will be clear from the description of an exemplary flow substrate selected from FIG. 3B and described below with respect to FIG. 4 in which exploded plan and cross-sectional views are illustrated.

Figure 4:
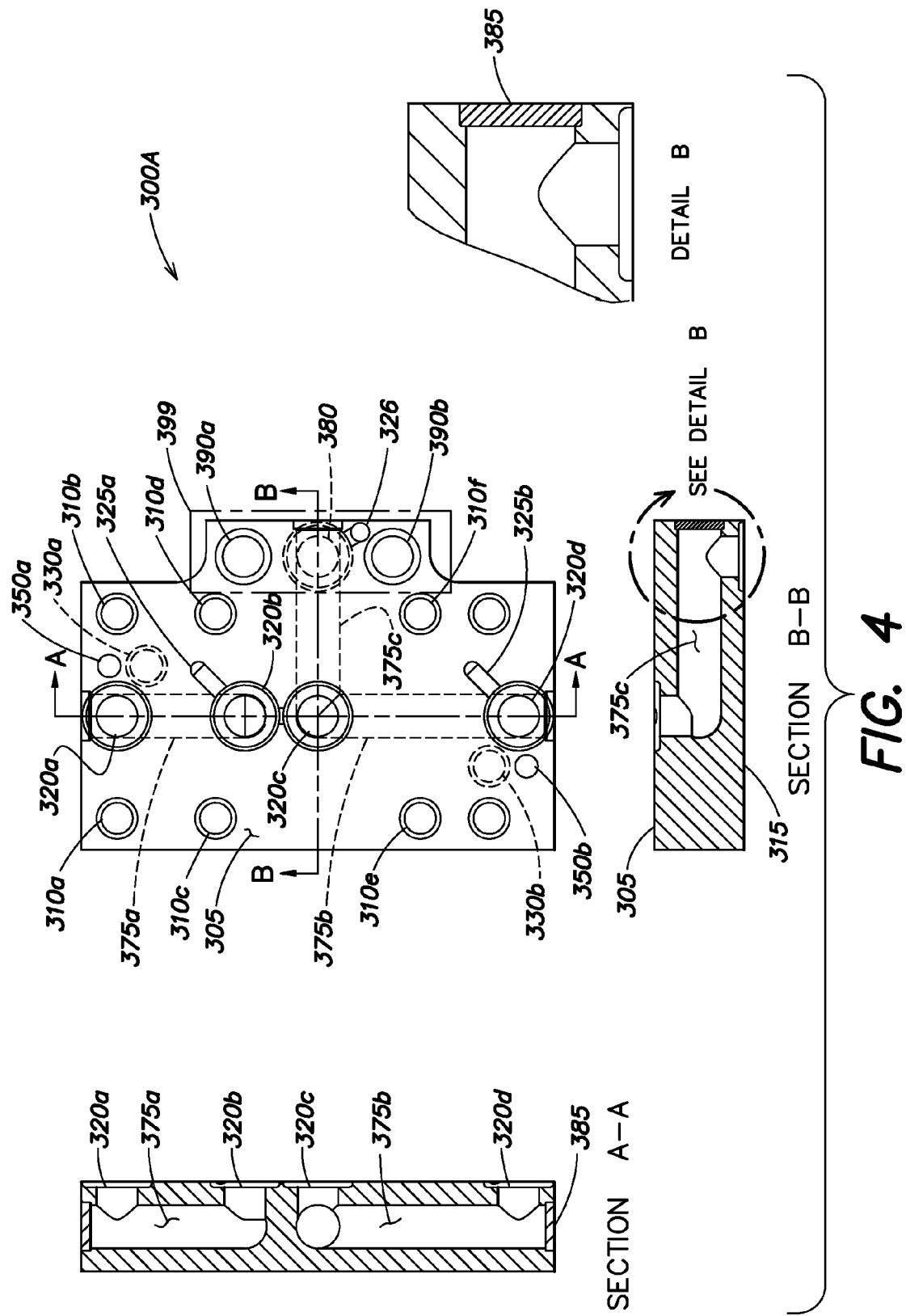
FIG. 4 illustrates exploded plan and cross-sectional views of an exemplary flow substrate selected from FIG. 3B.

FIG. 4 illustrates exploded plan and cross-sectional views of an exemplary flow substrate 300A in accordance with an embodiment of the present invention. The flow substrate 300A may be formed from a suitable solid block of material such as stainless steel, or where the application permits, from aluminum or brass. Where ionic contamination is a concern, polymer materials may be used, and the flow substrate may be formed from other than a solid block of material (e.g., by molding).

Formed in a component attachment surface 305 of the flow substrate are one or more component conduit ports 320. Component conduit port 320a would typically be fluidly connected to the port (inlet or outlet) of a first fluid handling component, while component conduit port 320b would typically be fluidly connected to the port (outlet or inlet) of a second fluid handling component that is distinct form the first fluid handling component. Component conduit ports 320b and 320c would typically be connected to the same fluid handling component and illustrate how the substrate 300A is specifically suited to fluid handling components having asymmetric port placement. Associated with component conduit port 320a is a pair of internally threaded component mounting apertures 310a, 310b, each of which would receive the threaded end of a fastener, such as fasteners 621 (in FIGS. 2A and 2B). Typically, each fluid handling component is attached to one or more flow substrates by four fasteners, as shown with respect to component conduit ports 320b and 320c and their associated component mounting apertures 310c, 310d, 310e, and 310f which would be used to mount a single fluid handling component in sealing engagement with component conduit ports 320b and 320c.

Associated with each pair of component conduit ports is a leak port 325a (for component conduit ports 320b and 320c), and 325b (for component conduit port 320d and the component conduit port of an adjacent flow substrate). Also visible on the component attachment surface 305 is a through hole 326 that extends between a leak port associated with manifold connection conduit port 380 and the component attachment surface 305 of the flow substrate, so that a faulty seal between a manifold and a flow substrate may be detected from above.

The flow substrate 300A includes a number of fluid pathways 375a, 375b, 375c that extend between conduit ports. For example, fluid pathway 375a extends between component conduit ports 320a and 320b, fluid pathway 375b extends between component conduit ports 320c and 320d, and fluid pathway 375c extends between component conduit port 320c and manifold connection conduit port 380 formed in connection attachment surface 315.

A plurality of dowel pin apertures 350a and 350b are formed that extend from the component attachment surface 305 through to the connection attachment surface 315. Each of these dowel pin apertures 350a and 350b can receive a dowel pin (not shown) and are used for backward compatibility with existing K1s systems, and may be omitted where backwards compatibility is not an issue.

A plurality of counter-bored manifold mounting apertures 390a and 390b are formed in the component attachment surface 305 of the flow substrate and extend through to the connection attachment surface 315. Each of these apertures receives a threaded fastener that extends through the flow substrate and is received in a threaded mounting aperture 410 of a respective manifold 400. The manifold conduit port 420 of the manifold 400 is pulled into sealing engagement with the manifold connection conduit port 380 of the flow substrate. It should be appreciated that in an alternative embodiment, the manifold mounting apertures 390a, 390b need not be counter-bored, but may instead use a fastener with a head sized suitably larger than the diameter of the aperture.

As can be seen in FIG. 4, component conduit ports 320, manifold connection conduit ports 380 and fluid pathways 375 are all machined in a cost-effective manner in which each has its corresponding axis of symmetry normal to the plane of the face of the flow substrate that is respectively pierced. Thus, as visible in FIG. 4, component conduit ports 320a, 320b, 320c, and 320d are formed by machining from the component attachment surface 305 into body of the flow substrate, manifold connection conduit port 380 is formed by machining from the connection attachment surface 315 into the body of the flow substrate, and fluid pathways 375a, 375b, and 375c are respectively formed by machining into the body of the flow substrate from the top surface illustrated in Section A-A, the bottom surface illustrated in Section A-A, and the right hand surface illustrated in Section B-B. After machining, each of the fluid pathways is sealed with an end cap 385 that is welded in place to form a fluid tight seal. Visible in dashed line form in FIG. 4 are a pair of flow substrate mounting apertures 330a and 330b that are offset from one another and may be used with the standardized fluid delivery stick bracket 500A depicted in FIG. 11A. Each of these mounting apertures is formed in the connection attachment surface 315 of the flow substrate and is internally threaded to receive a fastener 521 (FIGS. 2A and 2B) that mounts the flow substrate to the fluid delivery stick bracket 500A.

As shown in FIG. 4, the region 399 (shown in dashed lines) of the flow substrate 300A that interfaces with the manifold extends beyond other portions of the flow substrate, such that the fasteners that fasten fluid handling components to the flow substrate and the fasteners that fasten the manifold to the flow substrate 300A are all accessible from a single direction, and without any interference from other structures. Although the embodiment 300A of FIG. 4 shows only a portion 399 of the flow substrate extends beyond other portions, the present invention is not so limited. For example, FIG. 3A illustrates another flow substrate 300A (top row, third from the right) that includes a manifold connection conduit port 380 in which a width dimension of the flow substrate is uniformly greater than those flow substrates depicted in the same row.

Figure 5:
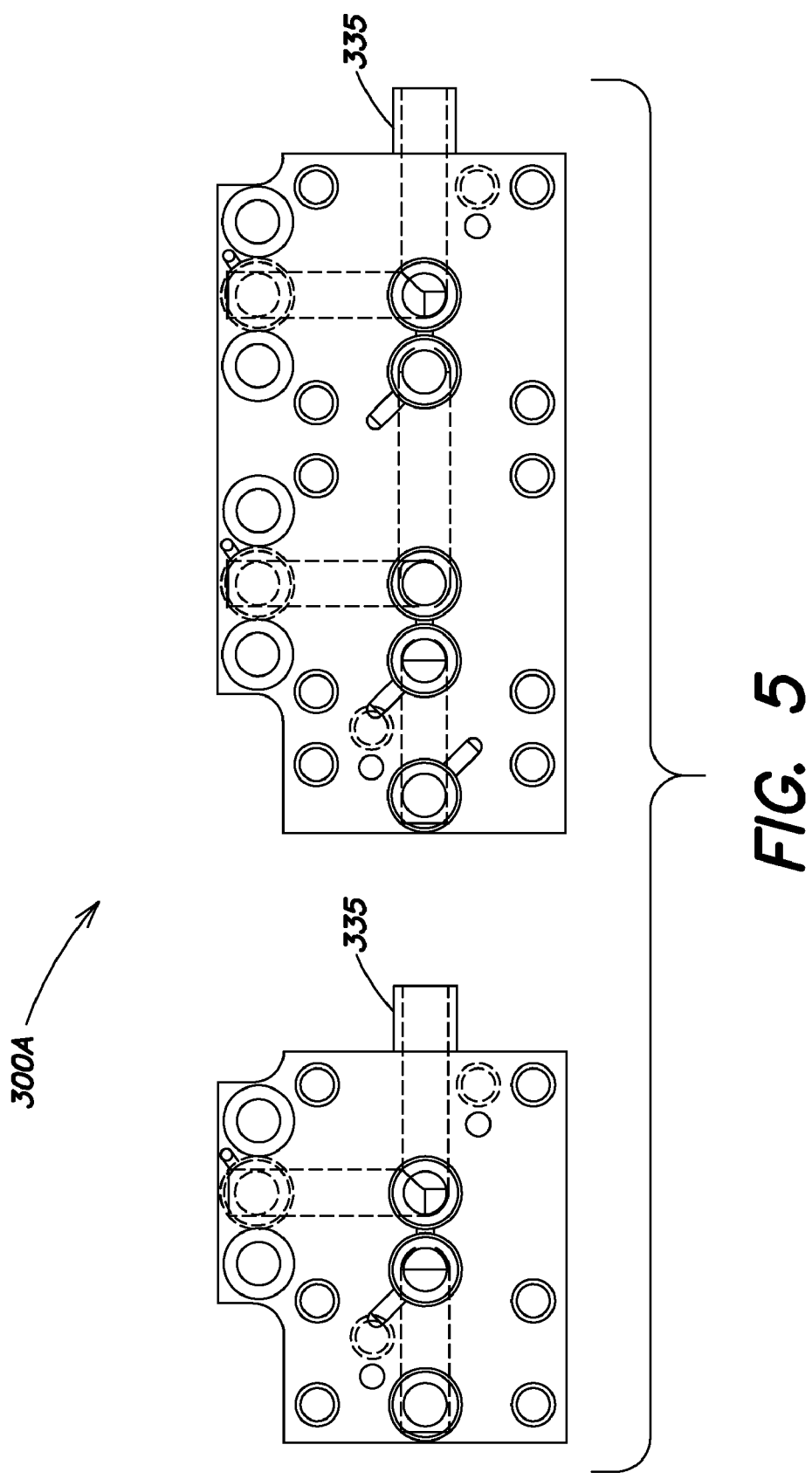
FIG. 5 illustrates a limited collection of modular flow substrates in accordance with the first embodiment depicted in FIG. 3A for use at higher fluid flow rates and which may be positioned at the beginning or end of a standardized fluid delivery stick.

FIG. 5 illustrates a collection of modular flow substrates in accordance with the first embodiment depicted in FIG. 3A for use at higher fluid flow rates and specifically adapted to be positioned at the beginning or end of a standardized fluid delivery stick. Each of these modular flow substrates includes a tube stub 335 suited for this purpose.

Figure 6A:
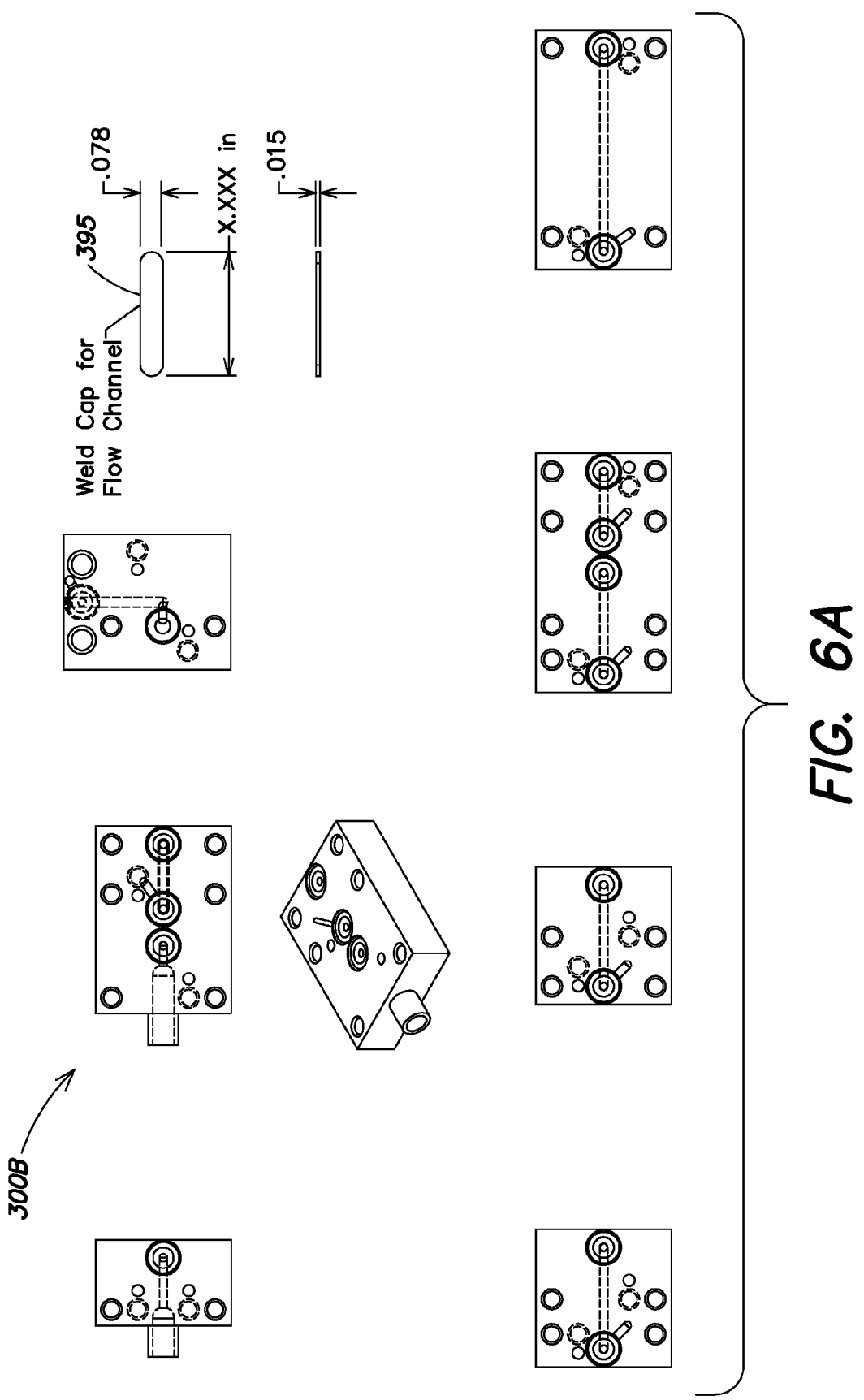
FIGS. 6A and 6B illustrate plan and elevation views of a variety of different flow substrates in accordance with the embodiment of FIG. 3A for use at lower fluid flow rates.
Figure 6B:
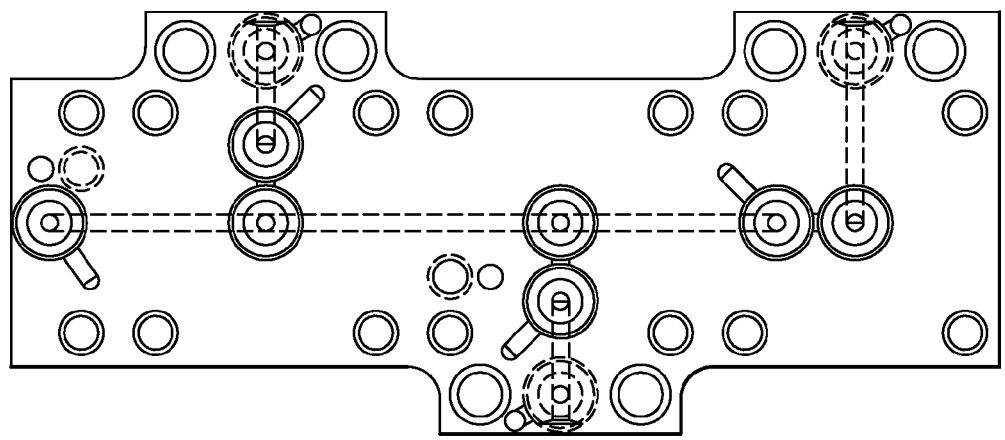
Figure 6B:
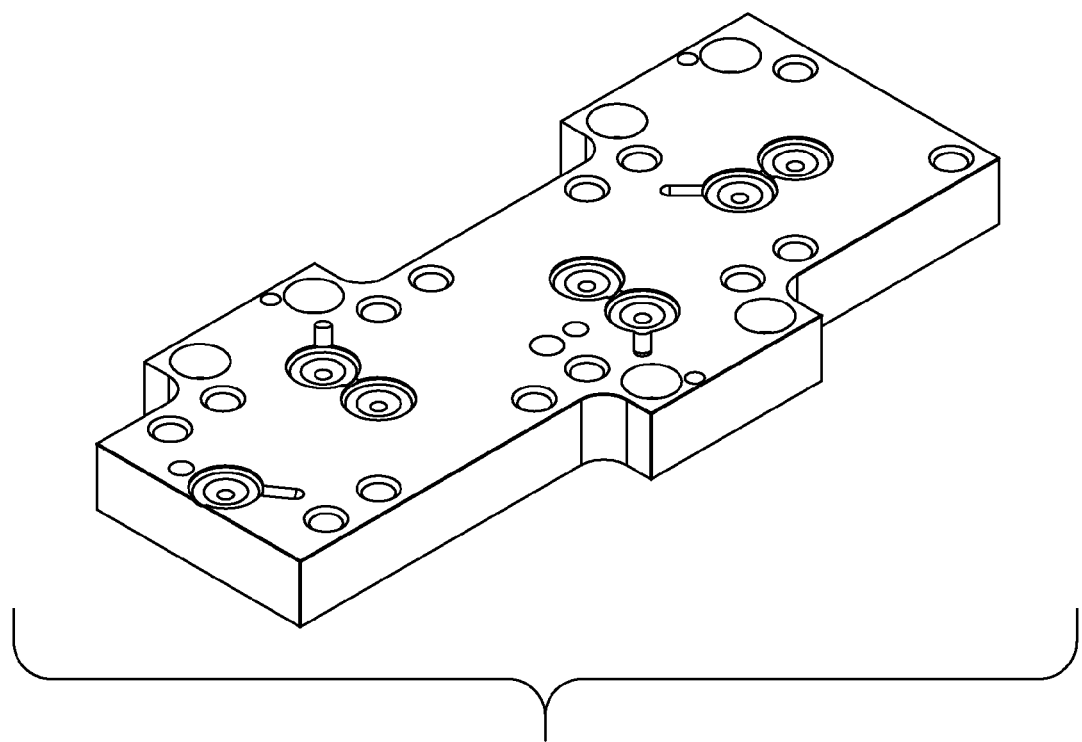

FIGS. 6A and 6B illustrate plan and elevation views of a variety of different flow substrates in accordance with the embodiment of FIGS. 3A and 3B, but for use at lower fluid flow rates. Like flow substrates 300A depicted in FIGS. 3A and 3B, each of the flow substrates depicted in FIGS. 6A and 6B is adapted for use with fluid handling components having asymmetric port placement. However, because these flow substrates are specifically adapted for lower flow rates by virtue of having a smaller diameter (0.09 inch rather than 0.18 inch) bore, each of these flow substrates is designated by the reference numeral 300B. All other aspects of flow substrates 300B are identical to those described previously with respect to flow substrates 300A, and thus only differences will be described in detail herein with respect to FIG. 7, in which like reference numerals correspond to the same features described previously with respect to FIGS. 3A, 3B, 4, and 5. It should be appreciated that although FIGS. 6A and 6B show a number of different flow substrates 300B specifically adapted for use at lower flow rates, not all of the possible porting arrangements are illustrated. In this regard, it should be appreciated that the same variations in porting arrangements shown with respect to flow substrates 300A in FIGS. 3A and 3B may be provided with respect to the flow substrates 300B. The manifolds used with flow substrate 300B may be the same as those described previously with respect to manifolds 400A and 400B of FIG. 3A.

Figure 7:
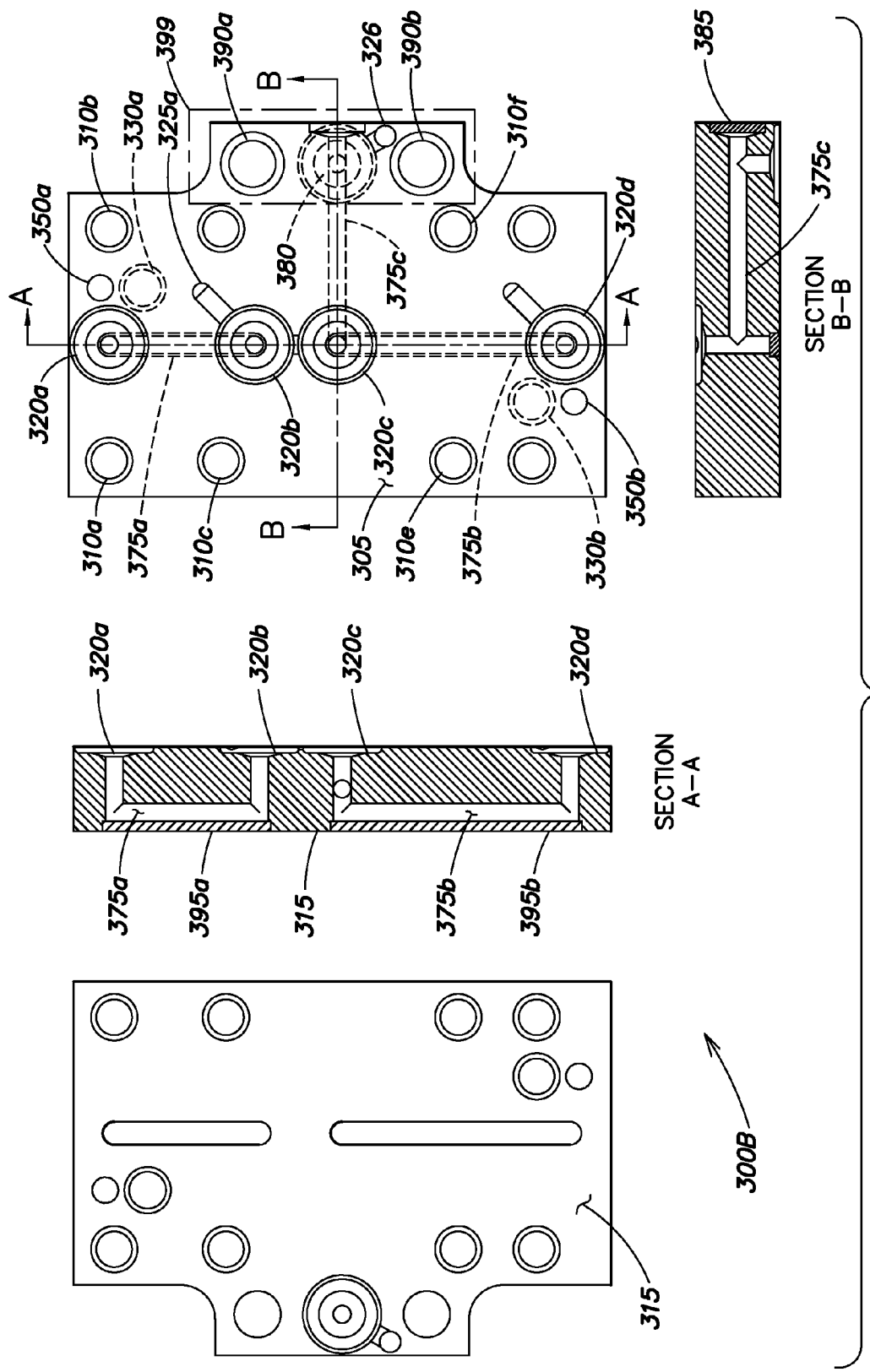
FIG. 7 illustrates exploded plan and cross-sectional views of an exemplary flow substrate for use at lower fluid flow rates.

As can be seen in FIG. 7, component conduit ports 320 and manifold connection conduit ports 380 of low flow substrate 300B are again machined in a cost-effective manner in which each has its corresponding axis of symmetry normal to the plane of the face of the flow substrate that is respectively pierced. Thus, as visible in FIG. 7, component conduit ports 320a, 320b, 320c, and 320d are formed by machining from the component attachment surface 305 into the body of the flow substrate, and manifold connection conduit port 380 is formed by machining from the connection attachment surface 315 into the body of the flow substrate. Fluid pathways 375a and 375b are formed by machining from component attachment surface 315, while fluid pathway 375c is formed by machining from the right hand surface illustrated in Section B-B. After machining, each of the fluid pathways 375a and 375b is sealed with a respective pathway cap 395a and 395b that is welded in place to form a fluid tight seal, and fluid pathway 375c is sealed with an end cap 385 that is welded in place to form a fluid tight seal. In one embodiment, the cap 395 may be formed from a sheet of stainless steel by laser cutting, by water jet cutting, or other suitable techniques. In other embodiments, other materials such as brass or aluminum may be used, and where ionic contamination is a concern and the flow substrate is formed from a polymer material, the cap 395 may be formed, for example, by molding a polymeric material that can later be epoxied into place.

Figure 11A:
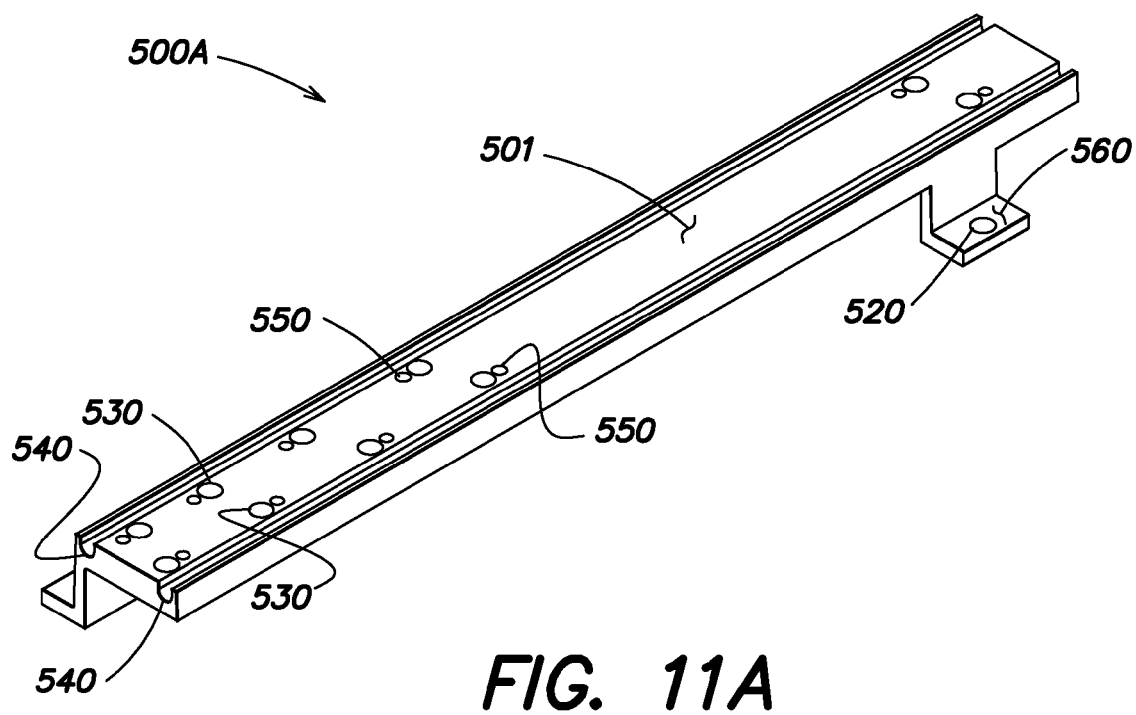
FIG. 11A illustrates a standardized fluid delivery stick bracket with offset flow substrate mounting apertures in accordance with one embodiment of the present invention.

Again visible in dashed line form in FIG. 7 are a pair of flow substrate mounting apertures 330a and 330b that are offset from one another and may be used with the standardized fluid delivery stick bracket 500A depicted in FIG. 11A. Each of these mounting apertures is formed in the connection attachment surface 315 of the flow substrate and is internally threaded to receive a fastener 521 (FIGS. 2A and 2B) that mounts the flow substrate to the fluid delivery stick bracket 500A.

As shown in FIG. 7, the region 399 (shown in dashed lines) of the flow substrate 300B that interfaces with the manifold extends beyond other portions of the flow substrate, such that the fasteners that fasten fluid handling components to the flow substrate and the fasteners that fasten the manifold to the flow substrate 300B are all accessible from a single direction, and without any interference from other structures. It should be appreciated that like the example of FIG. 3A (i.e., the flow substrate depicted in the top row, third from the right and shown as including a manifold connection port 380), the width dimension of those flow substrates 300B that include one or more manifold connection conduit ports 380 could be uniform, albeit greater than those flow substrates 300B that do not include any manifold connection conduit ports 380.

Figure 8A:
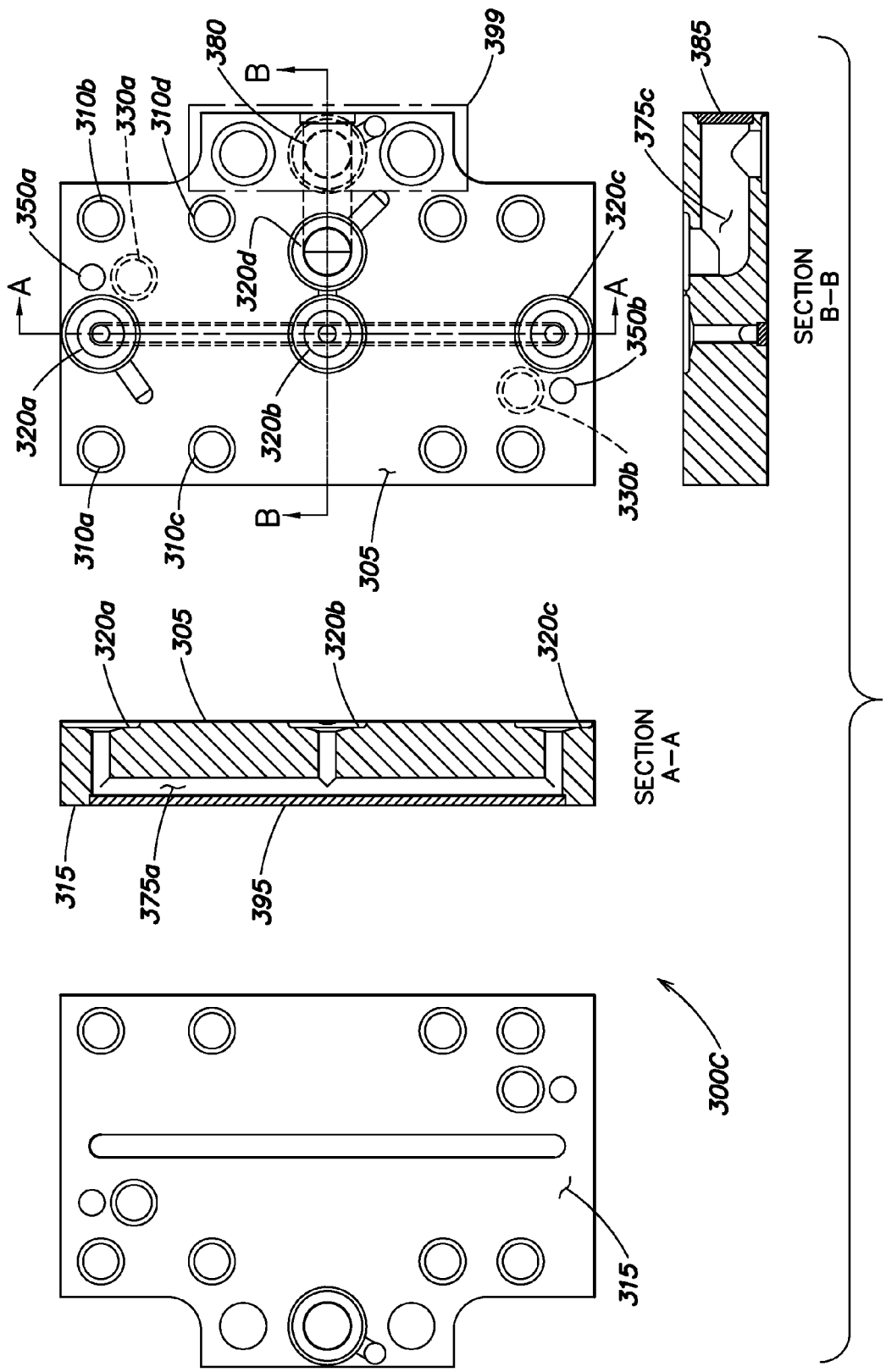
FIG. 8A illustrates plan and cross-sectional views of an exemplary alternative design flow substrate for use at lower fluid flow rates, in which the fluid pathway associated with the manifold connection conduit port has an increased diameter useful for pump/purge applications.
Figure 8B:
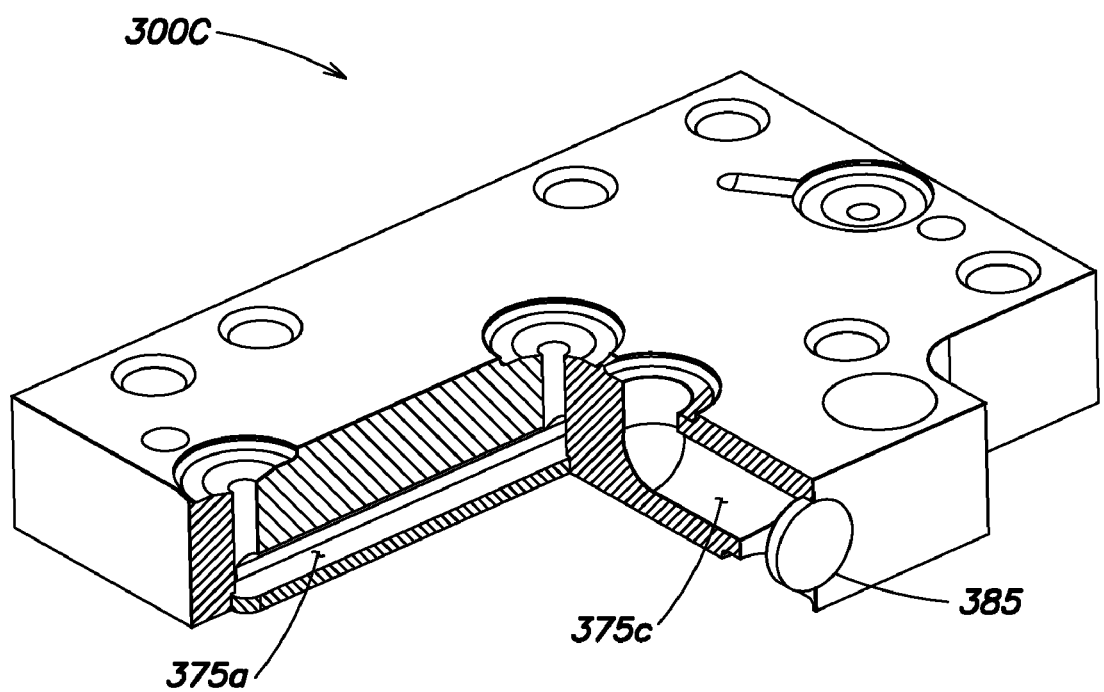
FIG. 8B illustrates a cut-away view of the exemplary flow substrate of FIG. 8A.

FIG. 8A illustrates plan and cross-sectional views of an exemplary alternative design flow substrate for use at lower fluid flow rates, in which the fluid pathway associated with the manifold connection conduit port has an increased diameter useful for pump/purge applications. FIG. 8B illustrates an isometric cut-away view of the exemplary flow substrate of FIG. 8A. Although only one specific embodiment of a flow substrate is depicted in the various views shown in FIGS. 8A-8B, it should be appreciated that other flow substrates may make use of a larger, higher flow component conduit ports, manifold connection conduit ports and fluid pathways in combination with other lower flow conduit ports and fluid pathways.

Like flow substrates 300A, and 300B described above, the flow substrate depicted in FIGS. 8A-8B is adapted for use with fluid handling components having asymmetric port placement. However, the flow substrate depicted in FIGS. 8A-8B is specifically adapted for lower flow rates by virtue of having a smaller diameter (0.09 inch rather than 0.18 inch) bore in the main fluid pathway 375a, in combination with a larger diameter (0.18 inch) fluid pathway 375c and manifold connection conduit port 380 for use in pump and purge operations. Accordingly, this flow substrate is designated by the reference numeral 300C. Other aspects of flow substrates 300C are similar or identical in function to those described previously with respect to flow substrates 300A and 300B, and thus only the salient differences will be described in detail herein with respect to FIGS. 8A-8B, in which like reference numerals correspond to the same or similar features described previously with respect to FIGS. 4 and 7.

As can be seen in FIG. 8A, component conduit ports 320 and manifold connection conduit ports 380 of substrate 300C are again machined in a cost-effective manner in which each has its corresponding axis of symmetry normal to the plane of the face of the flow substrate that is respectively pierced. Thus, as visible in FIG. 8A, component conduit ports 320a, 320b, 320c, and 320d are formed by machining from the component attachment surface 305 into the body of the flow substrate, and manifold connection conduit port 380 is formed by machining from the connection attachment surface 315 into the body of the flow substrate. However, the diameter of component conduit port 320d (0.18 inch) is double that of component conduit ports 320a-c, as is the diameter of manifold connection conduit port 380.

Due to its length and diameter, fluid pathway 375a is formed by machining from component attachment surface 315 into the body of the flow substrate, while fluid pathway 375c is formed by machining from the right hand surface illustrated in Section B-B. After machining, fluid pathway 375a is sealed with a pathway cap 395 that is welded in place to form a fluid tight seal, and fluid pathway 375c is sealed with an end cap 385 that is welded in place to form a fluid tight seal in a manner described previously.

Again visible in dashed line form in FIG. 8A are a pair of flow substrate mounting apertures 330a and 330b that are offset from one another and may be used with the standardized fluid delivery stick bracket 500A depicted in FIG. 11A. Each of these mounting apertures is formed in the connection attachment surface 315 of the flow substrate 300C and is internally threaded to receive a fastener 521 (FIGS. 2A and 2B) that mounts the flow substrate to the fluid delivery stick bracket 500A.

As shown in FIG. 8A, the region 399 (shown in dashed lines) of the flow substrate 300C that interfaces with the manifold extends beyond other portions of the flow substrate, such that the fasteners that fasten fluid handling components to the flow substrate and the fasteners that fasten the manifold to the flow substrate 300C are all accessible from a single direction, and without any interference from other structures.

Figure 9A:
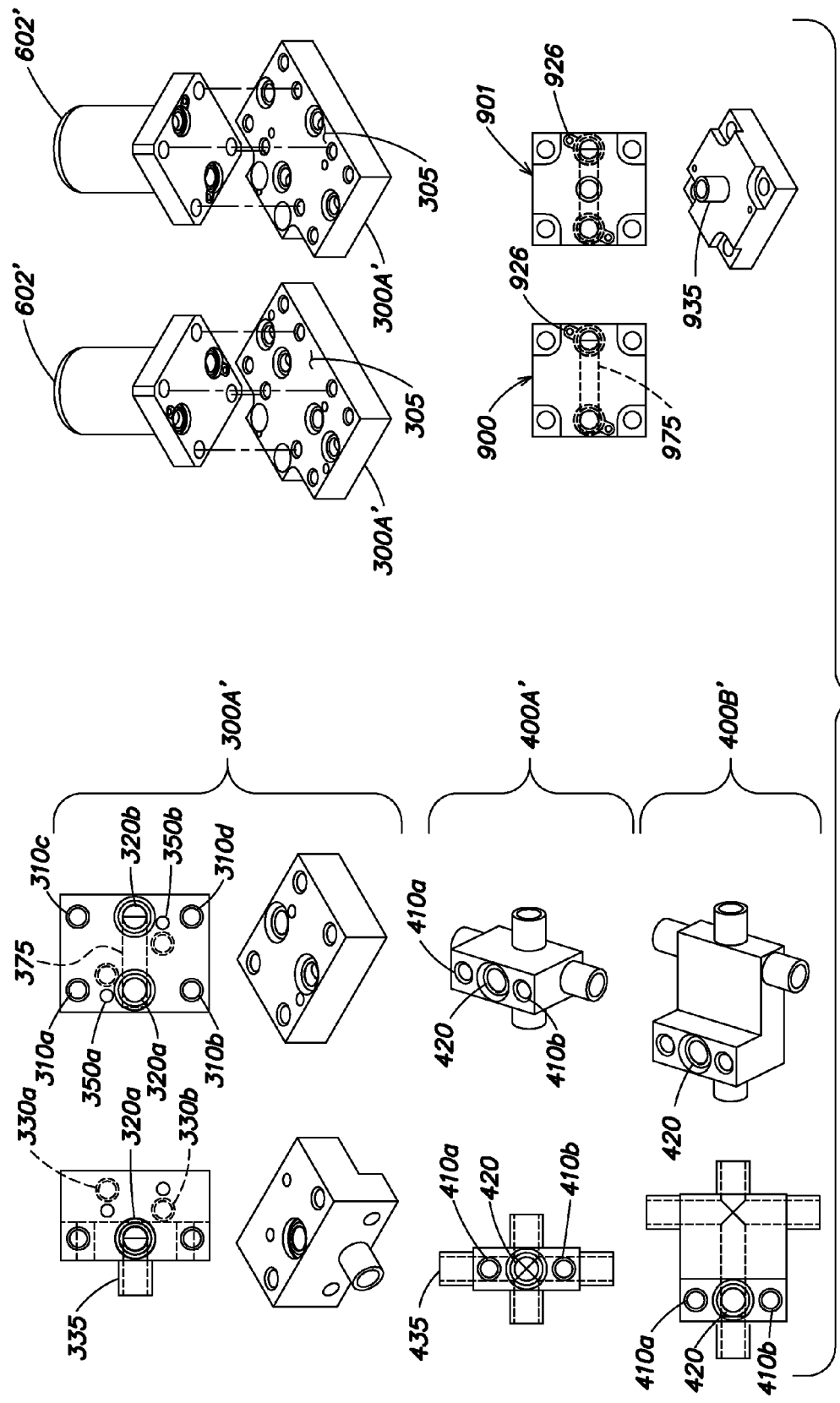
FIG. 9A illustrates a limited collection of modular flow substrates and modular manifolds in accordance with a second embodiment of the present invention for use with fluid handling components having symmetric port placement (e.g., W-Seal™ components)
Figure 9B:
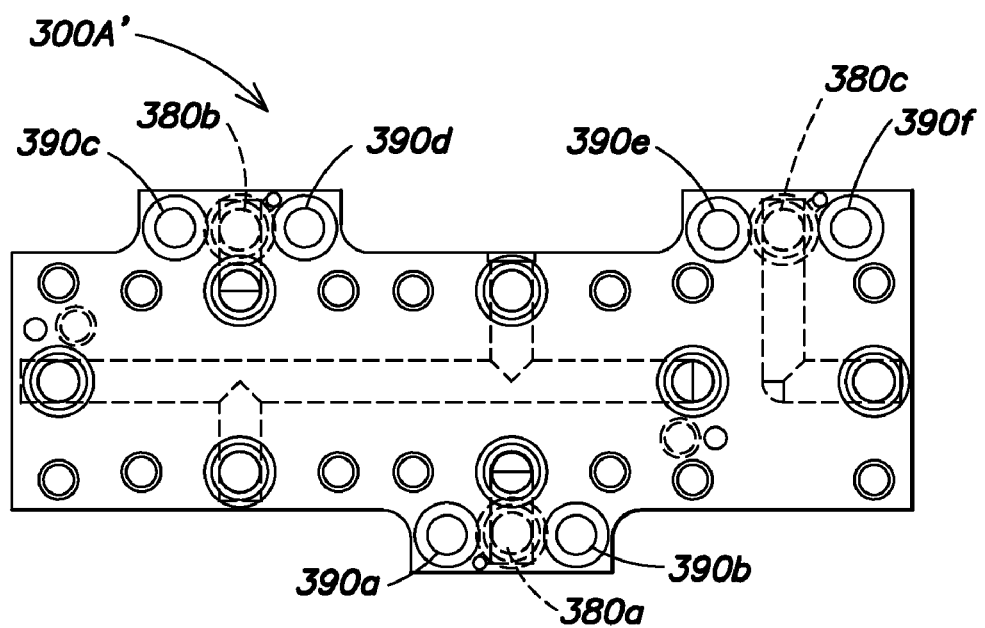
FIG. 9B illustrates plan and elevation views of a flow substrate in accordance with the embodiment of FIG. 9A for use at higher fluid flow rates.
Figure 9B:
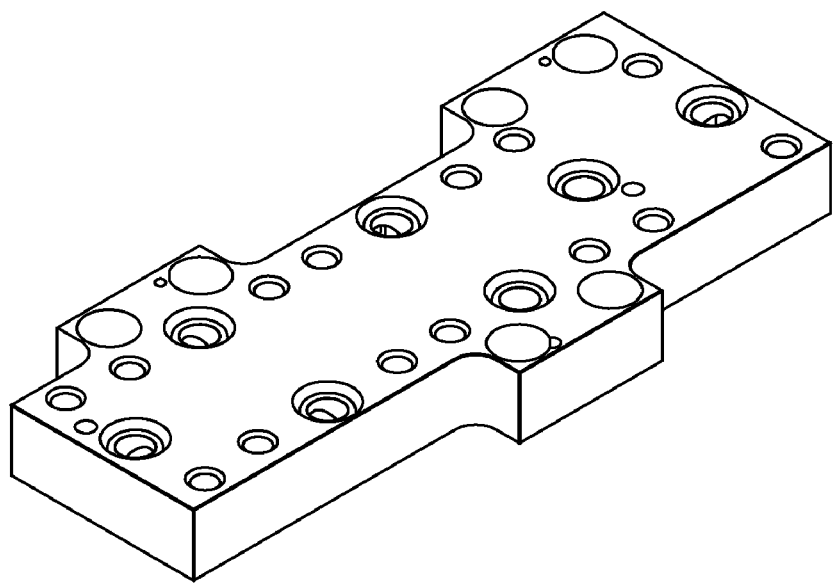

FIGS. 9A and 9B illustrate a limited collection of modular flow substrates and modular manifolds in accordance with a second embodiment of the present invention that is specifically adapted for use with fluid handling components having symmetric port placement (e.g., W-Seal™ components), such as the fluid handling component 602' depicted in FIG. 9A. The top right portion of FIG. 9A illustrates the manner in which a fluid handling component 602' may be attached to a flow substrate of this second embodiment, with the dashed lines showing which apertures in the base 610' of the fluid handling component are aligned with corresponding component mounting apertures in the component attachment surface 305 of the flow substrate.

In general, the modular flow substrates and the modular manifolds of this second embodiment are structurally and functionally similar to those of the first embodiment. For example, the flow substrates in accordance with this second embodiment may include flow substrates having tube stub connections 335, one or a plurality of component conduit ports 320 and/or manifold connection conduit ports 380, a plurality of component mounting apertures 310, a plurality of flow substrate mounting apertures 330, a plurality of manifold mounting apertures 390, etc. in a manner similar to flow substrates 300A, 300B, and 300C described previously. Because the main difference between the flow substrates 300A described previously relates to the symmetric (rather than asymmetric) placement of the component conduit ports 320 and the particular manner in which the component conduit ports are adapted to receive a particular type of seal (e.g., a W-Seal™ rather than a C-seal or other type of seal or gasket), this collection of flow substrates is designated by reference numeral 300A.'

Similarly, the modular manifolds of this second embodiment are structurally and functionally similar to those of the first embodiment and may include manifolds specifically adapted to additionally route fluid in a longitudinal direction where the longitudinal flow path is physically located between adjacent standardized fluid delivery sticks, designated by reference numeral 400A' in a manner analogous to manifolds 400A described previously, or to additionally route fluid in a longitudinal direction, where the longitudinal flow path is physically located below the standardized fluid delivery stick bracket 500, designated by reference numeral 400B' in a manner analogous to manifolds 400B. Although not specifically illustrated in FIGS. 9A and 9B, the flow substrates of this second embodiment may also be adapted to accommodate low flow applications in a manner analogous to flow substrates 300B described previously, or low flow applications with a higher flow pump/purge ability in a manner analogous to flow substrates 300C, also described previously.

Indeed, it should be appreciated that although FIGS. 9A and 9B show a number of different flow substrates 300A' and manifolds 400A' and 400B,' only a limited number of the possible porting arrangements are illustrated. In this regard, it should be appreciated that the same variations in porting arrangements shown with respect to the flow substrates 300A and the manifolds 400A and 400B in FIGS. 3A and 3B may be provided with respect to the flow substrates 300A' and the manifolds 400A' and 400B'. Because the main distinction between the flow substrates and manifolds of this second embodiment relate primarily to the symmetric (rather than asymmetric) placement of the component conduit ports 320 and the particular manner in which the component conduit ports are adapted to receive a particular type of seal (e.g., a W-Seal™), only the differences are described in detail herein.

Depicted in FIG. 9A are two new structures 900 and 901 that are unique to this second embodiment, but which may be adapted for use with flow substrates of the first embodiment in a straight-forward manner. For example, a cap 900 may be used to provide a passive fluid connection between adjacent component conduit ports 320 of a flow substrate where a fluid handling component is not desired. This cap 900 may be mounted to adjacent component conduit ports in the same manner as a fluid handling component, such that as depicted in the lower-right portion of FIG. 9A, the cap 900 would simply replace the fluid handling component 602'. As can be seen in FIG. 9A, the cap 900 may include a through hole 926 that extends between a leak port associated with a component conduit port 320 of the substrate 300A' so that a faulty seal between a cap and the flow substrate 300A' may be detected from above. An alternative cap structure 901 may be provided that is similar to cap 900, but which includes a tube stub connection 935 that permits additional fluid routing.

Figure 10:
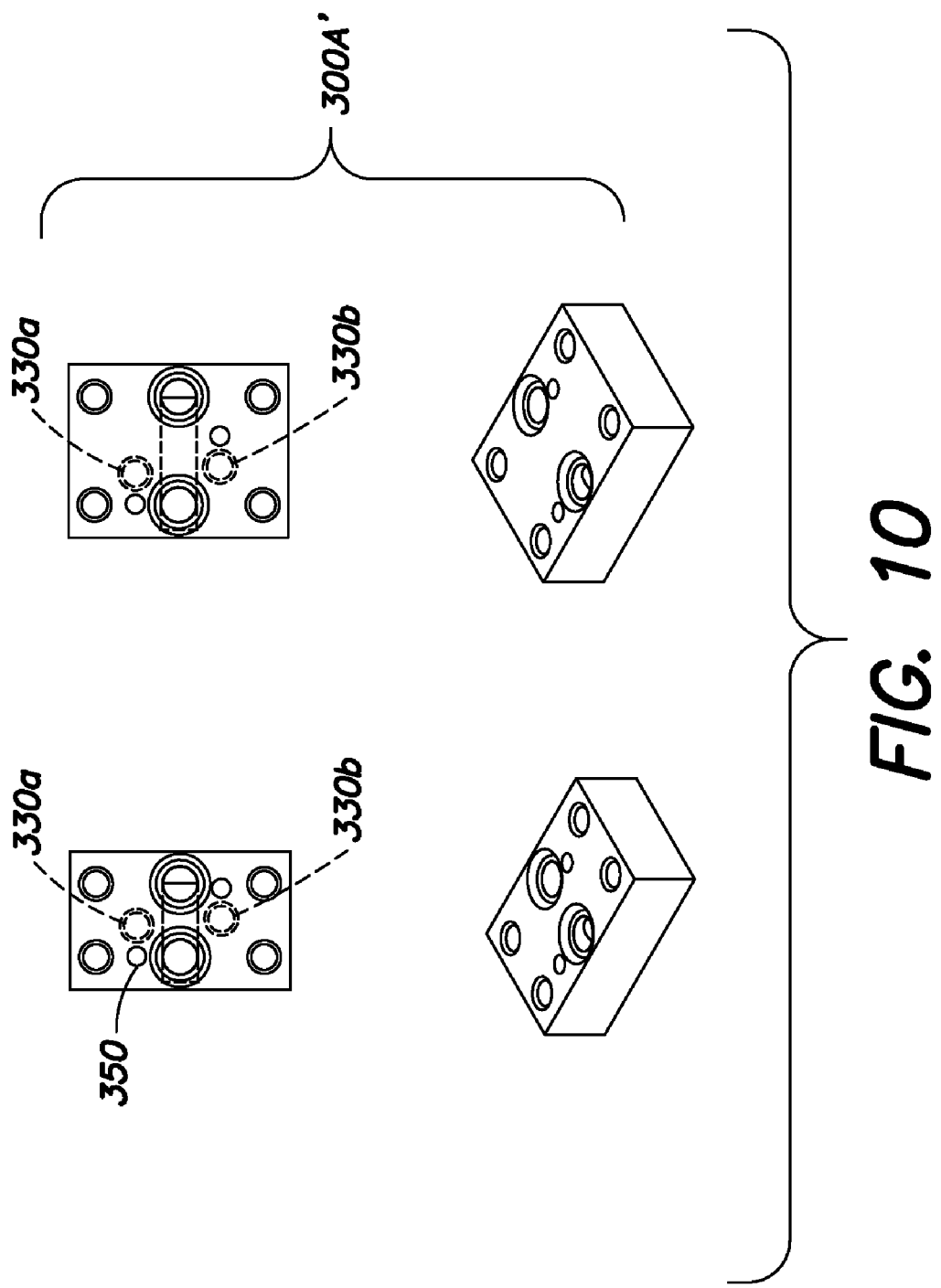
FIG. 10 illustrates a limited collection of modular flow substrates in accordance with the second embodiment depicted in FIG. 9A for use at higher fluid flow rates in which the flow substrates include flow substrate mounting apertures that are aligned with one another in accordance with one embodiment of the present invention.
Figure 11B:
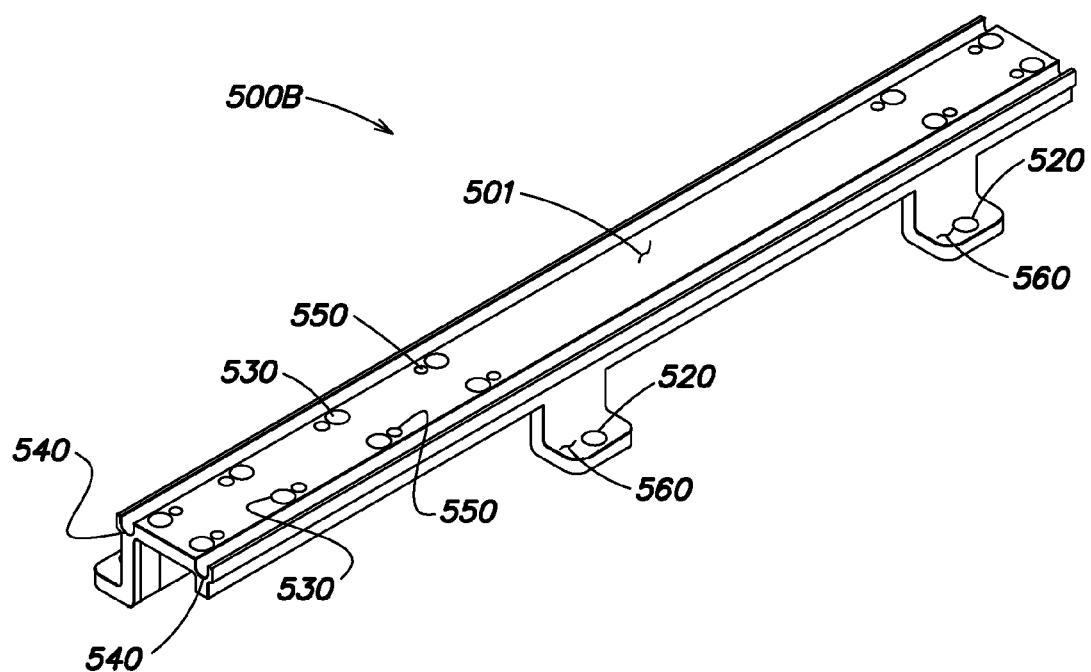
FIG. 11B illustrates a standardized fluid delivery stick bracket with aligned flow substrate mounting apertures in accordance with another embodiment of the present invention.

Shown in FIG. 10 is an alternative arrangement of the flow substrate mounting apertures 330a and 330b that may be used with the standardized fluid delivery stick bracket 500B depicted in FIG. 11B. Each of these mounting apertures 330a, 330b is formed in the connection attachment surface 315 of the flow substrate 300A' and is internally threaded to receive a fastener 521 (FIGS. 2A and 2B) that mounts the flow substrate to the fluid delivery stick bracket 500B. This alternative arrangement of mounting apertures 330 may be incorporated into any to of the flow substrates described previously, and advantageously permits the flow substrates to be mounted to the fluid delivery stick bracket 500B in one of two orientations, that differ from one another by a rotation of 180 degrees.

FIGS. 11A and 11B illustrate two different standardized fluid delivery stick brackets in accordance with the present invention, in which the standardized fluid delivery stick bracket 500A depicted in FIG. 11A uses offset flow substrate mounting apertures 530, and in which the standardized fluid delivery stick bracket 500B depicted in FIG. 11B uses aligned flow substrate mounting apertures 530. The standardized fluid delivery stick bracket 500B is depicted in FIGS. 2A and 2B.

Each of the standardized fluid delivery stick brackets 500A and 500B secure the standardized fluid delivery stick 200A, 200B (FIGS. 2A and 2B) to a fluid delivery panel backplane (not shown) and thereby hold adjacent standardized sticks in correct transverse alignment to enable connection between bottom located flow substrate transverse manifold connection conduit ports and corresponding ports in the underlying transverse oriented manifold(s). The standardized fluid delivery stick bracket 500A, 500B is preferably unitary and can be formed of folded heavy gage sheet metal, extruded or die cast aluminum, or similar suitable structural design.

As shown in FIGS. 11A and 11B, the fluid delivery stick bracket 500A, 500B includes a pair of U-shaped channels 540 that are dimensioned to receive a standard cartridge heater (not shown) for heating the flow substrates 300 that are mounted to the bracket 500A, 500B, and thereby, the process fluid flowing in the fluid delivery stick. As noted previously, fasteners 521 inserted from below and received in substrate mounting apertures 330 are used to mount the flow substrates 300 to the bracket 500A, 500B. Dowel pin apertures 550 to receive a dowel pin (not shown) are provided to help align the substrates with the apertures 530 in the bracket. The bracket 500A, 500B is itself mounted to the fluid delivery backplane by fasteners inserted through bracket mounting apertures 520 formed in mounting feet 560 of the bracket. The mounting feet 560 elevate the fluid delivery stick 200 above a top surface of the fluid delivery panel backplane to allow attachment of the manifolds 400 and to promote air circulation.

The fluid delivery stick bracket 500A, and specifically the arrangement of the substrate mounting apertures 530 and the dowel pin apertures 550 is specifically adapted for backwards compatibility with the K1s system. The arrangement of the substrate mounting apertures 530 and the dowel pin apertures 550 of the fluid delivery stick 500B permit compatible flow substrates 300 to be mounted to the fluid delivery stick bracket 500B in one of two orientations, where one orientation is rotated by 180 degrees relative to an axis normal to the substrate mounting surface 501 of the fluid delivery stick bracket 500B relative to the other. The spacing of the substrate mounting apertures 530 and the dowel pin apertures 550 of brackets 500A and 500B permit flow substrates of different length (viewed in a longitudinal direction from inlet to outlet of the stick) and having a varying number of component conduit ports formed in component attachment surface thereof to be placed adjacent to one another, as desired, while still registering with the flow substrate mounting apertures 330 and flow substrate dowel pin apertures 350 of the selected flow substrate. It should be appreciated that the spacing and number of mounting apertures 530 and the dowel pin apertures 550, and the spacing and number of substrate mounting apertures 330 and dowel pin apertures 350 may be varied to allow compatible flow substrates to be mounted to the fluid delivery stick bracket 500 in multiple orientations, or to be compatible with existing systems, or both.

As should be appreciated from the foregoing description, embodiments of Applicant's invention provide a fluid delivery panel design in which individual fluid delivery sticks may be removed as a single unit by access from only a single direction simply by removing fasteners associated with the transverse manifolds and the fasteners securing the mounting feet 560 of the respective bracket 500, each of which is accessible without the need to remove any other elements of the fluid delivery panel.

Embodiments of Applicant's invention provide a modular fluid delivery system where each flow substrate is built from port connection combinations containing one or more of (i) a MFC connection conduit port, (ii) an underside transverse manifold connection conduit port (when present), (iii) a central fluid handling component conduit port, or (iv) an edge component conduit port, or (v) an entire fluid handling component mounting location, where a specific collection of these flow substrates secured to a specific standardized fluid delivery stick bracket provides the fluid flow path for the specific standard fluid delivery stick fluid handling function, and where the transverse manifold connection conduit port is positioned off to the side (where there is usually an air circulation gap intentionally placed between fluid delivery sticks).

Although embodiments of the present invention have been described primarily with respect to the use of fluid handling components having two ports, it should be appreciated that embodiment of Applicant's invention could be modified for use with a three-port component, such as a 3-port valve. However, because such fluid handling components are less common, and typically more expensive, two-port fluid handling components are generally preferred.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A fluid delivery stick, comprising:
a fluid delivery stick bracket;
a plurality of flow substrates disposed on a surface of the fluid delivery stick bracket, the plurality of flow substrates including at least one flow substrate having a flow substrate body and a plurality of component conduit ports formed in a component attachment surface of the flow substrate body, the plurality of component conduit ports including first and second component conduits ports that are fluidly connected by a first fluid pathway formed in the flow substrate body and third and fourth component conduit ports that are fluidly connected by a second fluid pathway formed in the flow substrate body, the first and second fluid pathways extending between the first and second component conduit ports and the third and fourth component conduit ports along a first axis, the at least one flow substrate further including a manifold connection conduit port formed in a connection attachment surface of the flow substrate body that opposes the component attachment surface and a third fluid pathway formed in the flow substrate body that fluidly connects one of the second and third component conduit ports to the manifold connection conduit port, the third fluid pathway extending between the one of the second and third component conduit ports and the manifold connection conduit port along a second axis that is generally transverse to the first axis; and
a manifold having a manifold body and a manifold conduit port formed in a substrate attachment surface of the manifold body, the manifold including a tube stub connection extending from the manifold body in a direction parallel to one of the first axis and the second axis that is fluidly connected to the manifold conduit port by a manifold fluid pathway formed in the manifold body, wherein the manifold is constructed and arranged to be suspended below the at least one substrate and fastened to the flow substrate body by a pair of fasteners that are inserted through the flow substrate body from the component attachment surface of the flow substrate body and that maintain the manifold conduit port in sealing engagement with the manifold connection port.

2. The fluid delivery stick of claim 1, wherein the manifold is further constructed and arranged to be suspended below the at least one substrate without contacting the fluid delivery stick bracket.

3. The fluid delivery stick of claim 2, further comprising a fluid handling component fastened to the component attachment surface of the at least one substrate, the fluid handling component having a first component port in sealing engagement with the second component conduit port and a second component port in sealing engagement with the third component conduit port, wherein the fluid delivery stick bracket is mounted to a support surface by a plurality of fasteners, and wherein the fluid delivery stick bracket, the fluid handling component, and each of the plurality of flow substrates can be dismounted from the support surface as an integral unit by removing only the plurality of fasteners and the pair of fasteners that maintain the manifold conduit port in sealing engagement with the manifold connection port.

4. The fluid delivery stick of claim 1, wherein the manifold includes a plurality of tube stub connections extending from the manifold body and fluidly connected to the manifold conduit port by the manifold fluid pathway, the plurality of tube stub connections including a first tube stub connection extending from the manifold body in a direction parallel to the first axis and a second tube stub connection extending from the manifold body in a direction parallel to the second axis.

5. The fluid delivery stick of claim 1, wherein the first and second fluid pathways have a first diameter and wherein the third fluid pathway has a second diameter that is larger than the first diameter.

6. The fluid delivery stick of claim 1, wherein each of the plurality of component conduit ports is formed by machining from the component attachment surface into the flow substrate body, and wherein each of the first and second fluid pathways is formed by machining from the connection attachment surface.

* * * * *